United States Patent
Ikeda et al.

(10) Patent No.: US 10,216,345 B2
(45) Date of Patent: Feb. 26, 2019

(54) DISPLAY

(71) Applicant: Japan Display Inc., Tokyo (JP)

(72) Inventors: Masanobu Ikeda, Tokyo (JP); Koji Ishizaki, Tokyo (JP); Hayato Kurasawa, Tokyo (JP); Yoshihiro Watanabe, Tokyo (JP); Toshimasa Ishigaki, Tokyo (JP); Daisuke Sonoda, Tokyo (JP); Tatsuya Ide, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/660,540

(22) Filed: Jul. 26, 2017

(65) Prior Publication Data

US 2017/0322652 A1 Nov. 9, 2017

Related U.S. Application Data

(63) Continuation of application No. 14/742,360, filed on Jun. 17, 2015, now Pat. No. 9,746,977.

(30) Foreign Application Priority Data

Jun. 18, 2014 (JP) .................................. 2014-125011

(51) Int. Cl.
  *G02F 1/1333* (2006.01)
  *G06F 3/044* (2006.01)
  (Continued)

(52) U.S. Cl.
  CPC .......... *G06F 3/044* (2013.01); *G02F 1/13338* (2013.01); *G02F 1/136204* (2013.01); *G06F 3/0412* (2013.01); *G02F 2001/134372* (2013.01)

(58) Field of Classification Search
  CPC ...... G06F 3/044; G06F 3/0412; G02F 1/1338; G02F 1/136204; G02F 1/13338; G02F 2001/134372
  (Continued)

(56) References Cited

U.S. PATENT DOCUMENTS

| 2012/0062511 A1* | 3/2012 | Ishizaki ................ G06F 3/0412 345/174 |
| 2013/0335365 A1* | 12/2013 | Kim ...................... G06F 3/0412 345/174 |

(Continued)

FOREIGN PATENT DOCUMENTS

| JP | 09-105918 A | 4/1997 |
| JP | 2012-63839 A | 3/2012 |

(Continued)

*Primary Examiner* — Charles Chang
(74) *Attorney, Agent, or Firm* — Michael Best & Friedrich LLP

(57) ABSTRACT

To reduce disturbances in display of images due to static electricity without deteriorating optical properties in a display. The display includes a conductive pattern provided on the upper surface of the substrate, a protection layer provided on the upper surface of the substrate to cover the conductive pattern, and a conductive layer provided on the protection layer. The sheet resistance of the conductive pattern is not more than 8 Ω/square. A ratio of the total sum of areas of portions of the plurality of sub-pixels that overlap the conductive pattern in a plan view to the total sum of the areas of the plurality of sub-pixels is 1 to 22%. A sheet resistance of the conductive layer is higher than the sheet resistance of the conductive pattern.

8 Claims, 20 Drawing Sheets

(51) Int. Cl.
*G06F 3/041* (2006.01)
*G02F 1/1362* (2006.01)
*G02F 1/1343* (2006.01)

(58) Field of Classification Search
USPC .......................................................... 349/12
See application file for complete search history.

(56) References Cited

U.S. PATENT DOCUMENTS

| | | |
|---|---|---|
| 2014/0152613 A1 | 6/2014 | Ishizaki et al. |
| 2014/0292710 A1 | 10/2014 | Koito et al. |
| 2014/0292713 A1 | 10/2014 | Koito et al. |
| 2014/0293158 A1 | 10/2014 | Kurasawa et al. |
| 2014/0320760 A1 | 10/2014 | Ishizaki et al. |

FOREIGN PATENT DOCUMENTS

| | | |
|---|---|---|
| JP | 2014-109904 A | 6/2014 |
| JP | 2014-191650 A | 10/2014 |
| JP | 2014-191657 A | 10/2014 |
| JP | 2014-191660 A | 10/2014 |
| JP | 2014-191661 A | 10/2014 |

\* cited by examiner

DISPLAY

CROSS-REFERENCE TO RELATED APPLICATION

The present application is a Continuation Application of U.S. patent application Ser. No. 14/742,360 filed Jun. 17, 2015, which claims priority from Japanese Patent Application No. 2014-125011 filed on Jun. 18, 2014, the content of which is hereby incorporated by reference into this application.

TECHNICAL FIELD OF THE INVENTION

The present invention relates to a display, and particularly to a display including a liquid crystal layer.

BACKGROUND OF THE INVENTION

Displays such as liquid crystal displays include, for instance, an array substrate, an opposing substrate disposed to oppose the array substrate, and a liquid crystal layer interposed between the array substrate and the opposing substrate. The array substrate or the opposing substrate is provided with a light shielding portion having a lattice-like shape in a plan view, and a plurality of pixels are divided by the light shielding portion. The array substrate is formed, for instance, with a thin film transistor (TFT) as a switching element.

In such a display, in each of the plurality of pixels, an electric field is formed in the liquid crystal layer, for instance, by applying voltage between pixel electrodes provided in each of the pixels and common electrodes provided in common for a plurality of pixels. With this arrangement, each of the pixels performs display based on image data, and an image is displayed, for instance, on an outer side of the opposing substrate.

In such displays, some are provided with a conductive pattern on the opposing substrate on the opposite side of the array substrate for reducing disturbances in display of images upon application of static electricity.

For instance, Japanese Patent Application Laid-Open Publication No. H09-105918 (Patent Document 1) recites a technique in which a conductive layer with translucency is formed on a surface on the opposite side of a liquid crystal layer of a transparent substrate on a farther side with respect to a backlight unit of a liquid crystal display for preventing occurrence of abnormalities of display upon application of high potentials such as static electricity from the exterior of a surface of a liquid crystal display panel.

Further, Japanese Patent Application Laid-Open Publication No. 2012-63839 (Patent Document 2) recites a technique in which a display with touch detection functions is provided with touch detecting electrodes provided on an opposing substrate and a conductive layer being either isolated from or connected to the touch detecting electrodes at high resistance and being disposed to cover the touch detecting electrodes for reducing disturbances of display also upon application of static electricity.

SUMMARY OF THE INVENTION

In the technique recited in the above Patent Literature 2, static electricity applied to the display with touch detection functions is moved from the conductive layer to the touch detecting electrodes, and static electricity moved to the touch detecting electrodes is moved to a grounding line or the like of the display with touch detection functions. In this manner, by providing a conductive layer or a conductive pattern such as touch detecting electrodes or the like on the opposing substrate, static electricity applied to the display can be discharged to the exterior of the display through the conductive layer or the conductive pattern such as touch detecting electrodes or the like provided on the opposing substrate. Further, for easily discharging static electricity to the exterior of the display, it is necessary to reduce a sheet resistance of the conductive pattern.

When the conductive pattern provided on such an opposing substrate is comprised of a transparent conductive material such as indium tin oxide (ITO) or indium zinc oxide (IZO), it is necessary to increase the thickness of the conductive pattern or to increase an area ratio of the conductive pattern for reducing the sheet resistance of the conductive pattern. However, when either the thickness of the conductive pattern is increased or the area ratio of the conductive pattern is increased, the transmittance of the display is degraded, and optical properties of the display are deteriorated. Accordingly, it is difficult to reduce disturbances in display of images caused through static electricity without deteriorating optical properties.

The present invention has been made to solve the above-described problems of the related art, and it is an object thereof to provide a display capable of reducing disturbances in display of images caused through static electricity without deteriorating optical properties.

The following is a brief description of an outline of the typical invention disclosed in the present application.

A display as an aspect of the present invention includes a first substrate having a first main surface, a second substrate having a second main surface and a third main surface on an opposite side of the second main surface and being disposed to oppose the first substrate such that the second main surface and the first main surface of the first substrate oppose each other, and a liquid crystal layer interposed between the first main surface of the first substrate and the second main surface of the second substrate. The display also includes a plurality of pixels provided on the first main surface of the first substrate, a plurality of first electrodes respectively provided in each of the plurality of pixels on the first main surface of the first substrate, and second electrodes provided on the first main surface of the first substrate. The display also includes a first conductive pattern provided on the third main surface of the second substrate, a protection layer provided on the third main surface of the second substrate to cover the first conductive pattern, and a conductive layer provided on the protection layer. A sheet resistance of the first conductive pattern is not more than 8 Ω/square. A ratio of a total sum of areas of portions of the plurality of pixels that overlap the first conductive pattern in a plan view to a total sum of areas of the plurality of pixels is 1 to 22%. A sheet resistance of the conductive layer is higher than the sheet resistance of the first conductive pattern.

Further, a display as an aspect of the present invention includes a first substrate having a first main surface, a second substrate having a second main surface and a third main surface on an opposite side of the second main surface and being disposed to oppose the first substrate such that the second main surface and the first main surface of the first substrate oppose each other, and a liquid crystal layer interposed between the first main surface of the first substrate and the second main surface of the second substrate. The display also includes a plurality of pixels provided on the first main surface of the first substrate, a plurality of first electrodes respectively provided in each of the plurality of pixels on the first main surface of the first substrate, and second electrodes provided on the first main surface of the first substrate. The display also includes a first conductive pattern provided on the third main surface of the second substrate, and a protection layer provided on the third main surface of the second substrate to cover the first conductive pattern. A sheet resistance of the first conductive pattern is not more than 8 Ω/square. A ratio of a total sum of areas of portions of the plurality of pixels that overlap the first conductive pattern in a plan view to a total sum of areas of the plurality of pixels is 1 to 22%. A sheet resistance of the protection layer is higher than the sheet resistance of the first conductive pattern.

BRIEF DESCRIPTIONS OF THE DRAWINGS

DESCRIPTIONS OF THE PREFERRED EMBODIMENTS

Figure 1:
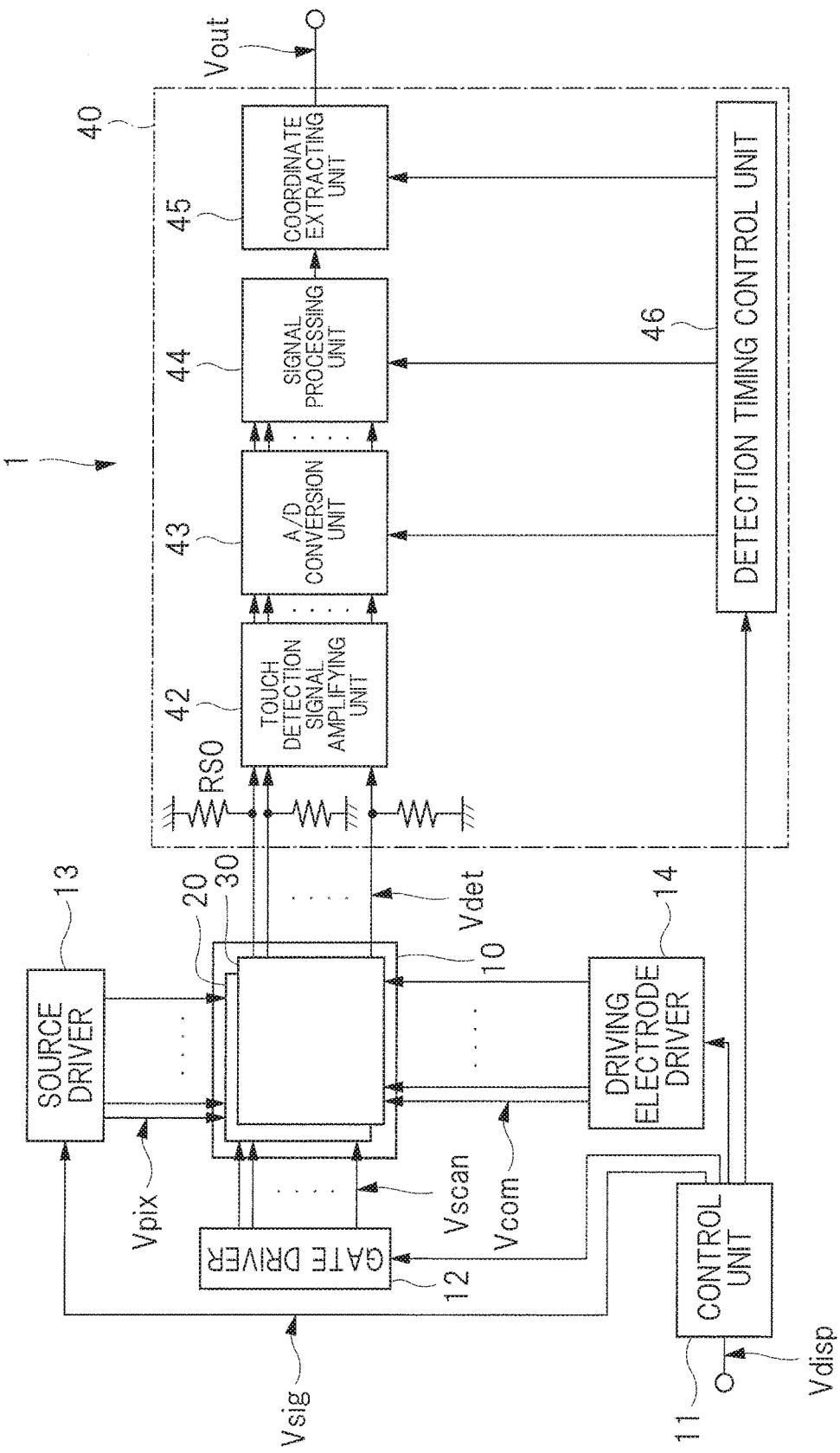
FIG. 1 is a block diagram showing one configuration example of a display according to a first embodiment.

Hereinafter, embodiments of the present invention will be described with reference to drawings.

Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

Further, in some drawings used in the embodiments, hatching is omitted in some cases even in a cross-sectional view so as to make the drawings easy to see. Still further, hatching is used in some cases even in a plan view so as to make the drawings easy to see.

Further, in the case where a range is indicated as A to B in the following embodiment, it is assumed to be A or more and B or less except for the cases where it is clearly indicated in particular.

First Embodiment

First, an example in which a display provided with a touch panel as an input device is applied to a liquid crystal display with touch detection functions of in cell type will be explained as the first embodiment. In the present descriptions, an input device is an input device detecting electrostatic capacities which change at least depending on capacities of objects that approach or contact electrodes. Further, a liquid crystal display with touch detection functions is a liquid crystal display provided with detecting electrodes for touch detection on either an array substrate 2 or an opposing substrate 3 which form the display. Moreover, in the first embodiment, a display with touch detection functions of in cell type characterized in that driving electrodes operate as driving electrodes of the display and operate as driving electrodes of the input device will be described.

<Overall Configuration>

First, the overall configuration of the display of the first embodiment will be explained with reference to FIG. 1. FIG. 1 is a block diagram showing one configuration example of the display according to the first embodiment.

The display 1 includes a display device with touch detection functions 10, a control unit 11, a gate driver 12, a source driver 13, a driving electrode driver 14 and a touch detection unit 40.

The display device with touch detection functions 10 includes a display device 20 and a touch detection device 30. In the first embodiment, the display device 20 is a display device using liquid crystal display elements as display elements. Accordingly, the display device 20 might also be referred to as a liquid crystal display device 20 in the following descriptions. The touch detection device 30 is a touch detection device of electrostatic capacity method, namely a touch detection device of electrostatic capacity type. Therefore, the display 1 is a display including an input device with touch detection functions. The display device with touch detection functions 10 is a display device in which the liquid crystal display device 20 and the touch detection device 30 are integrated, and is a display device incorporating touch detection functions, namely, it is a display device with touch detection functions of in cell type.

In this respect, the display device with touch detection functions 10 might also be a display device in which the touch detection device 30 is mounted onto the display device 20.

The display device 20 performs display by sequentially performing scanning by each horizontal line in a display region in accordance with scanning signals Vscan supplied from the gate driver 12. The touch detection device 30 operates based on a principle of electrostatic capacity type touch detection as will be described later and outputs detecting signals Vdet.

The control unit 11 is a circuit which supplies control signals to the gate driver 12, the source driver 13, the driving electrode driver 14 and the touch detection unit 40, respectively, based on video signals Vdisp supplied from the exterior and which controls these members to operate in sync with each other.

The gate driver 12 has a function of sequentially selecting a horizontal line which is an object of display driving of the display device with touch detection functions 10 based on control signals supplied from the control unit 11.

The source driver 13 is a circuit which supplies pixel signals Vpix to sub-pixels SPix (see FIG. 7 to be described later) included in the display device with touch detection functions 10 based on control signals of image signals Vsig supplied from the control unit 11.

The driving electrode driver 14 is a circuit which supplies driving signals Vcom to driving electrodes COML (see FIG. 5 or FIG. 6 to be described later) included in the display device with touch detection functions 10 based on control signals supplied from the control unit 11.

The touch detection unit 40 is a circuit which detects presence/absence of touch of the touch detection device 30 by an input tool such as a finger or a touch pen, namely a state of contact or approach to be described later based on control signals supplied from the control unit 11 and the detecting signals Vdet supplied from the touch detection device 30 of the display device with touch detection functions 10. The touch detection unit 40 is a circuit which obtains coordinates of a touch detection region in the presence of a touch, namely an input position or the like. The touch detection unit 40 includes a touch detection signal amplifying unit 42, an A/D (analog/digital) conversion unit 43, a signal processing unit 44, a coordinate extracting unit 45, and a detection timing control unit 46.

The touch detection signal amplifying unit 42 amplifies detecting signals Vdet supplied from the touch detection device 30. The touch detection signal amplifying unit 42 might also include a low pass analog filter which removes high frequency components, namely noise components, included in detecting signals Vdet and which extracts and respectively outputs touch components.

<Principle of Electrostatic Capacity Type Touch Detection>

Figure 2:
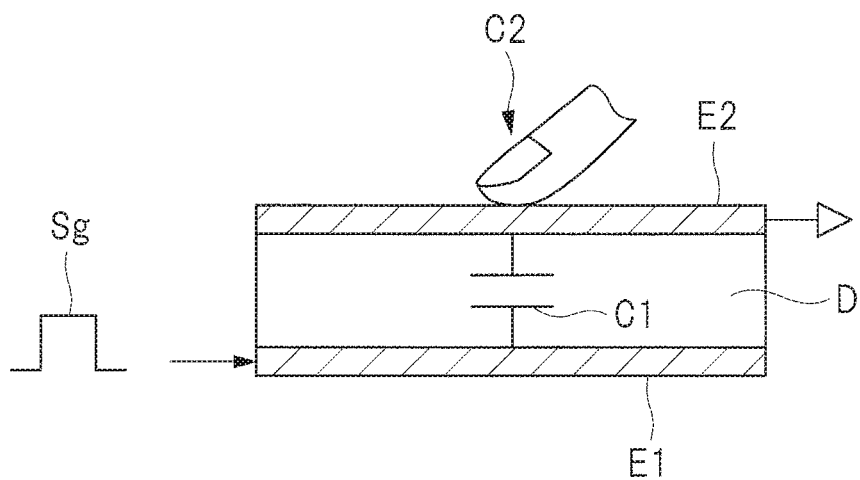
FIG. 2 is an explanatory view showing a state of a finger which has contacted or approached a touch detection device.
Figure 3:
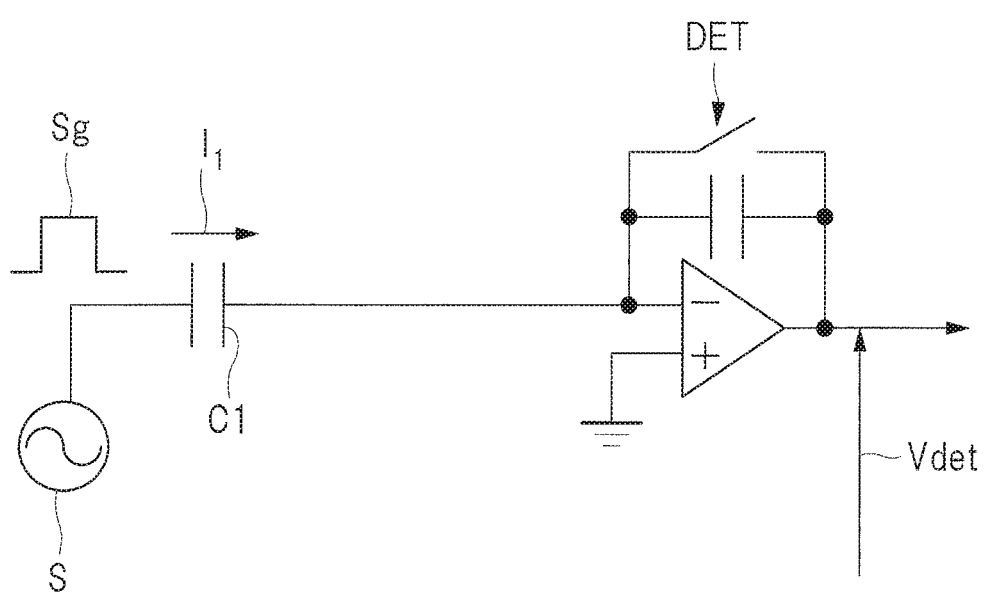
FIG. 3 is an explanatory view showing an example of an equivalent circuit in a state of the finger which has contacted or approached the touch detection device.
Figure 4:
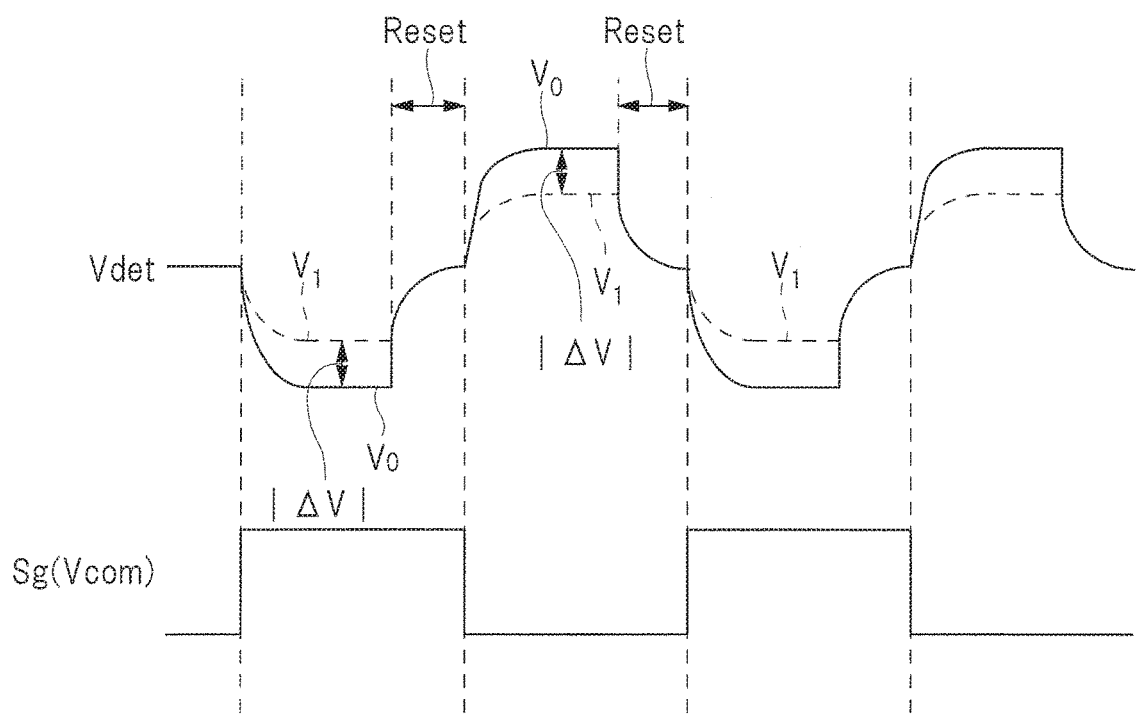
FIG. 4 is a diagram showing examples of waveforms of driving signals and detecting signals.

A principle of touch detection in the display 1 according to the first embodiment will be explained with reference to FIG. 1 to FIG. 4. FIG. 2 is an explanatory view showing a state of a finger which has contacted or approached the touch detection device. FIG. 3 is an explanatory view showing an example of an equivalent circuit in a state of the finger which has contacted or approached the touch detection device. FIG. 4 is a diagram showing examples of waveforms of driving signals and detecting signals.

As shown in FIG. 2, in electrostatic capacity type touch detection, an input device referred to as a touch panel or a touch sensor includes driving electrodes E1 and detecting electrodes E2 disposed to oppose each other with a conductive body D interposed therebetween. Capacitive elements C1 are formed by the driving electrodes E1 and the detecting electrodes E2. As shown in FIG. 3, one ends of the capacitive elements C1 are connected to an alternating signal source S which is a driving signal source while the other ends of the capacitive elements C1 are connected to a voltage detector DET which is the touch detection unit. The voltage detector DET includes, for instance, an integrating circuit included in the touch detecting signal amplifying unit 42 shown in FIG. 1.

When alternating rectangular waves Sg having, for instance, a frequency in the range of several kHz to several hundreds of kHz are applied from the alternating signal source S to the one ends of the capacitive elements C1, namely to the driving electrodes E1, detecting signals Vdet which are output waveforms are generated by means of voltage detector DET connected to the other ends of the capacitive elements C1, namely the detecting electrodes E2 side. In this respect, the alternating rectangular waves Sg correspond to the driving signals Vcom which are, for instance, shown in FIG. 4.

In a state no finger has contacted or approached, namely in a non-contact state, current $I_1$ corresponding to the capacity value of the capacitive elements C1 is made to flow in accordance with discharge and charge of the capacitive elements C1 as shown in FIG. 3. The voltage detector DET converts fluctuations in the current $I_1$ in accordance with the alternating rectangular waves Sg into fluctuations in voltage. These voltage fluctuations are shown as waveforms $V_0$ indicated by solid lines in FIG. 4.

On the other hand, in a state a finger has contacted or approached, namely in a contact state, the capacity value of the capacitive elements C1 which are formed of the driving electrodes E1 and detecting electrodes E2 becomes small being affected by the electrostatic capacity C2 which is formed by the finger. Accordingly, the current $I_1$ flowing through the capacitive elements C1 as shown in FIG. 3 fluctuates. The voltage detector DET converts fluctuations in the current $I_1$ in accordance with the alternating rectangular waves Sg into fluctuations in voltage. These voltage fluctuations are shown as waveforms $V_1$ indicated by broken lines in FIG. 4. In this case, the amplitude of waveforms $V_1$ is smaller than that of the above-described waveforms $V_0$. With this arrangement, absolute values $|\Delta V|$ of voltage differences between the waveforms $V_0$ and waveforms $V_1$ change in accordance with influences of an object such as a finger which approaches from the exterior. In this respect, in order to accurately detect absolute values $|\Delta V|$ of voltage differences between the waveforms $V_0$ and waveforms $V_1$, it is preferable that the voltage detector DET operates while providing periods Reset during which discharge and charge of the condenser is reset to match frequencies of the alternating rectangular waves Sg through switching within the circuit.

In the example shown in FIG. 1, the touch detection device 30 performs touch detection for each detection block corresponding to one or a plurality of driving electrodes COML (see FIG. 5 or FIG. 6 to be described later) in accordance with driving signals Vcom which are supplied from the driving electrode driver 14. Namely, the touch detection device 30 outputs detecting signals Vdet by means of the voltage detector DET shown in FIG. 3 for each detection block corresponding to each of the one or a plurality of the driving electrodes COML, and the output detecting signals Vdet are supplied to the touch detection signal amplifying unit 42 of the touch detector unit 40.

The A/D conversion unit 43 is a circuit which performs sampling of respective analog signals which are output from the touch detection signal amplifying unit 42 at timing which are in sync with the driving signals Vcom and converts them into digital signals.

The signal processing unit 44 includes a digital filter for reducing frequency components other than frequencies of which the driving signals Vcom are sampled, namely noise components, included in the output signals of the A/D conversion unit 43. The signal processing unit 44 is a logic circuit which detects the presence/absence of touch with respect to the touch detection device 30 based on output signals of the A/D conversion unit 43. The signal processing unit 44 performs processes of extracting only differential voltages caused by the finger. The differential voltages caused by the finger are the above-described absolute values $|\Delta V|$ of differences between the waveforms $V_0$ and waveforms $V_1$. It is also possible that the signal processing unit 44 performs calculations of averaging absolute values $|\Delta V|$ per each detection block to obtain average values of the absolute values $|\Delta V|$. With this arrangement, the signal processing unit 44 can reduce influences of noise. The signal processing unit 44 compares the detected differential voltage caused by the finger with a predetermined threshold voltage, and when the voltage is not less than the threshold voltage, it is determined that a contact state of an externally approaching object approaching from the exterior is present, and when it is less than the threshold voltage, it is determined that a non-contact state of an externally approaching object is present. In this manner, touch detection is performed by the touch detection unit 40.

The coordinate extracting unit 45 is a logic circuit which obtains coordinates of a position at which touch has been detected, namely an input position on the touch panel upon detection of a touch by the signal processing unit 44. The detection timing control unit 46 performs control such that the A/D conversion unit 43, the signal processing unit 44 and the coordinate extracting unit 45 operate in sync with each other. The coordinate extracting unit 45 outputs the touch panel coordinates as signal outputs Vout.

<Module>

Figure 5:
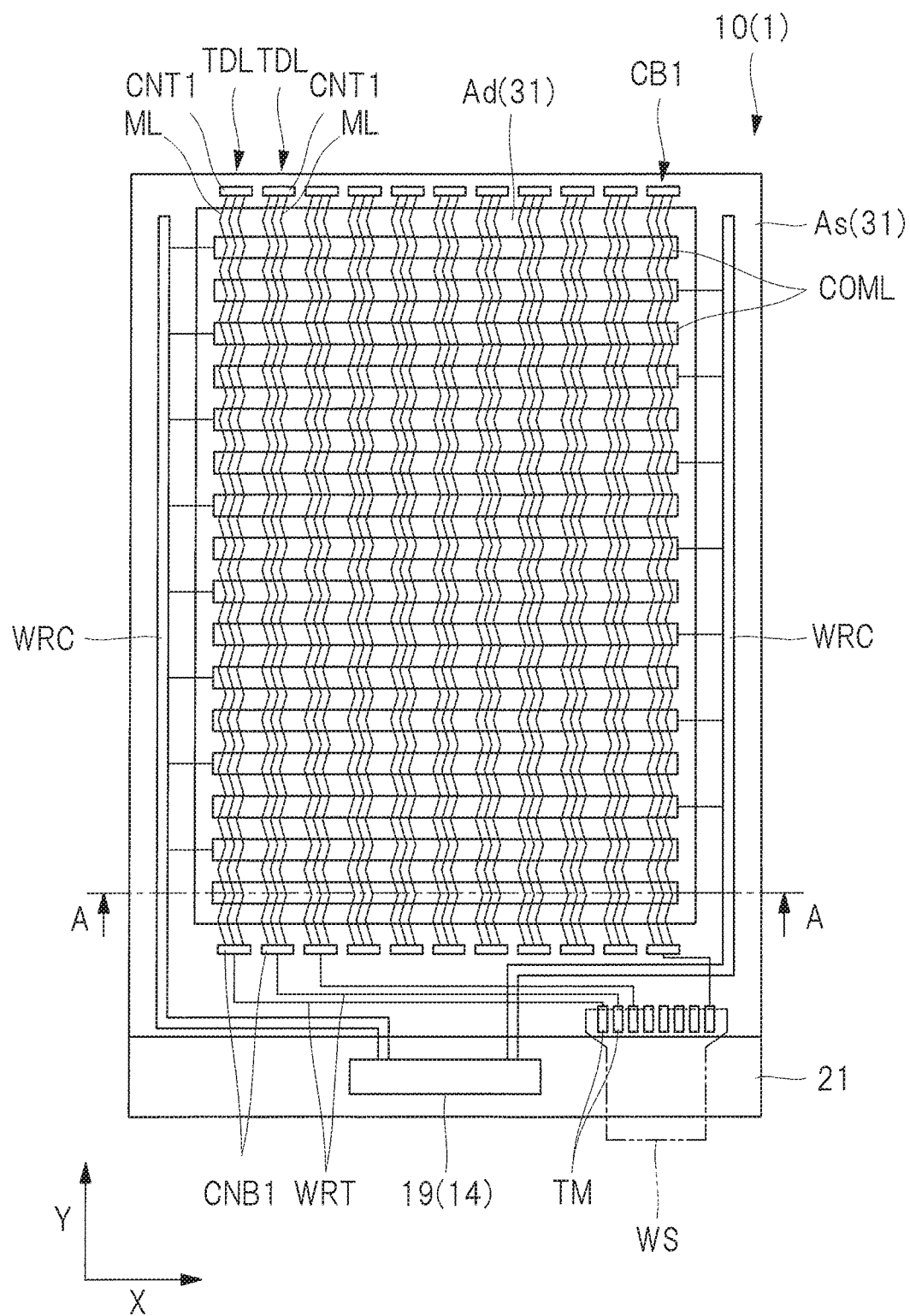
FIG. 5 is a plan view showing one example of a module mounted with the display according to the first embodiment.

FIG. 5 is a plan view showing one example of a module mounted with the display according to the first embodiment.

As shown in FIG. 5, the display device with touch detection functions 10 according to the first embodiment includes a substrate 21, a substrate 31, a plurality of driving electrodes COML and a plurality of detecting electrodes TDL. The substrate 31 includes an upper surface as one main surface and a lower surface as the other main surface on the opposite side of the upper surface. Here, two directions which intersect with each other and which are preferably orthogonal within the upper surface of the substrate 31 or within the lower surface of the substrate 31 are defined as an X axis direction and a Y axis direction. At this time, each of the plurality of driving electrodes COML respectively extends in the X axis direction and is aligned in the Y axis direction in a plan view. Further, each of the plurality of detecting electrodes TDL respectively extends in the Y axis direction and is aligned in the X axis direction in a plan view.

As it will be described using FIG. 7, each of the plurality of driving electrodes COML is provided to overlap a plurality of sub-pixels SPix aligned in the X axis direction in a plan view. Namely, one driving electrode COML is provided as a common electrode of the plurality of sub-pixels SPix.

In this respect, in the present descriptions, the expression "in a plan view" indicates that objects are seen from a direction perpendicular to the upper surface as the main surface of the substrate 31 or the substrate 21.

In the example shown in FIG. 5, the display device with touch detection functions 10 has a rectangular shape including two sides respectively extending in the X axis direction and opposing each other in a plan view and two sides respectively extending in the Y axis direction and opposing each other in a plan view. A terminal unit TM is provided on one side of the display device with touch detection functions 10 in the Y axis direction. The terminal unit TM and each of the plurality of detecting electrodes TDL are electrically connected by means of routing wirings WRT, respectively. The terminal unit TM is electrically connected to a wiring substrate WS and the wiring substrate WS is connected to the touch detection unit 40 (see FIG. 1) mounted to the exterior of the module. Accordingly, the detecting electrodes TDL are connected to the touch detection unit 40 via the routing wirings WRT, the terminal unit TM and the wiring substrate WS.

The display device with touch detection functions 10 includes a COG 19. The COG 19 is a chip mounted on the substrate 21, and incorporates circuits necessary for display operations such as the control unit 11, the gate driver 12 or the source driver 13 as shown in FIG. 1. The COG 19 might also incorporate the driving electrode driver 14. While detailed illustrations are omitted, the COG 19 and each of the plurality of driving electrodes COML are electrically connected through routing wirings WRC.

In this respect, it is possible to use various substrates which are transparent with respect to visible light such as a glass substrate or a film made of resin as the substrate 21 or the substrate 31. In the present descriptions, the expression "transparent with respect to visible light" indicates that the transmittance with respect to visible light is not less than, for instance, 90%, and the transmittance with respect to visible light indicates an average value of transmittance with respect to light having, for instance, a wavelength of 380 to 780 nm. Further, the transmittance indicates a ratio of light which has transmitted up to a surface on the opposite side of the rear surface of the display device with touch detection functions 10 in the display region Ad from among light which has been irradiated to the rear surface of the display device with touch detection functions 10 (see FIG. 6 to be described later).

<Display Device with Touch Detection Functions>

Figure 6:
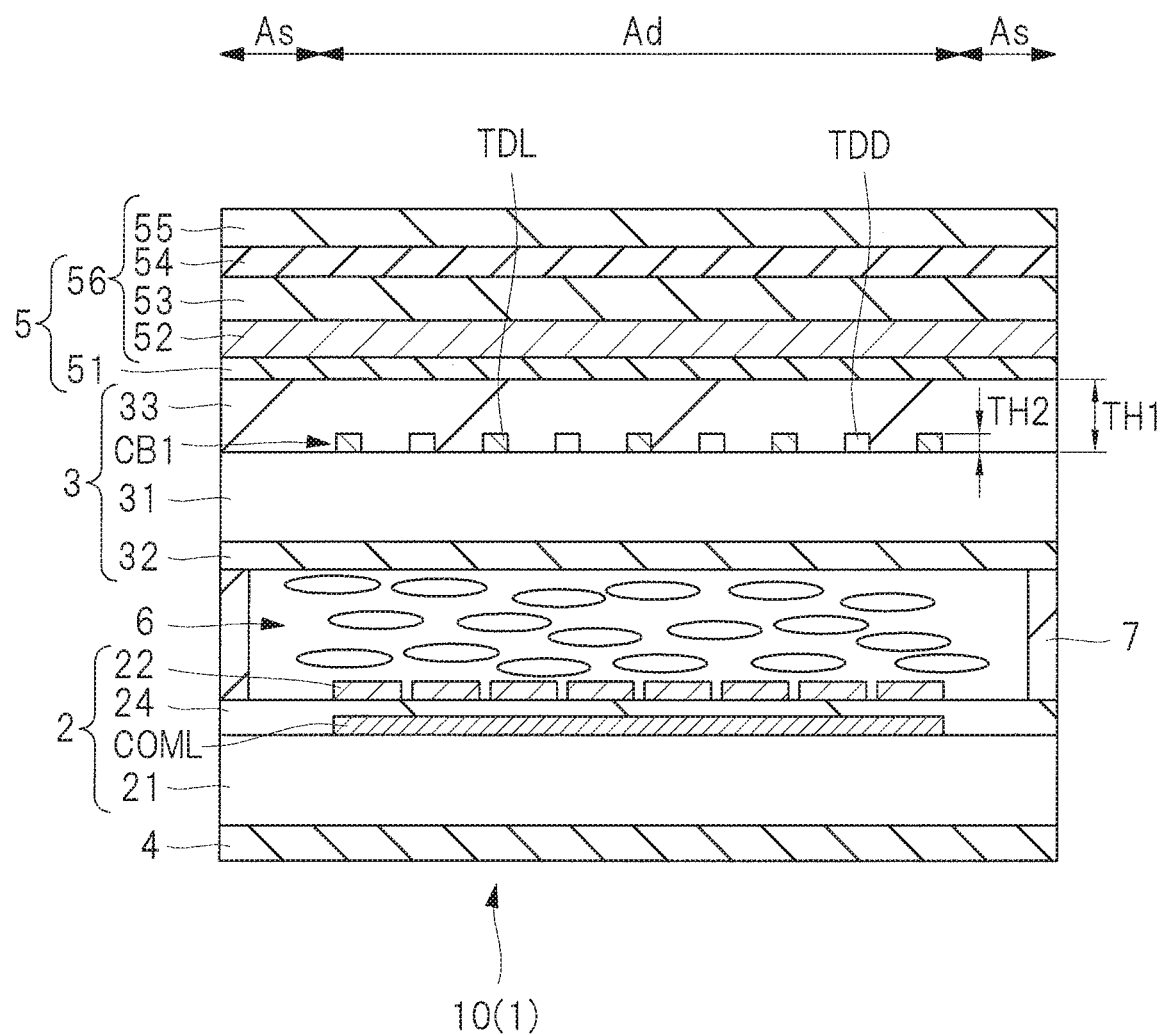
FIG. 6 is a sectional view showing a display device with touch detection functions of the display according to the first embodiment.

Next, a configuration example of the display device with touch detection functions 10 will be explained in details with reference to FIG. 5 to FIG. 8. FIG. 6 is a sectional view showing the display device with touch detection functions of the display according to the first embodiment. FIG. 7 is a circuit diagram showing the display device with touch detection functions of the display according to the first embodiment. FIG. 8 is a perspective view showing one configuration example of the driving electrodes and the detecting electrodes of the display according to the first embodiment. FIG. 6 is a sectional view along line A-A of FIG. 5.

The display device with touch detection functions 10 includes the array substrate 2, the opposing substrate 3, a polarizing plate 4, a polarizing plate 5, a liquid crystal layer 6 and a sealing portion 7. The opposing substrate 3 is disposed to oppose the array substrate 2 such that the upper surface as the main surface of the array substrate 2 and the lower surface as the main surface of the opposing substrate 3 oppose each other. The polarizing plate 4 is provided on the opposite side of the opposing substrate 3 with the array substrate 2 being interposed therebetween. The polarizing plate 5 is provided on the opposite side of the array substrate 2 with the opposing substrate 3 being interposed therebetween. The liquid crystal layer 6 is provided between the array substrate 2 and the opposing substrate 3. Namely, the liquid crystal layer 6 is interposed between the upper surface of the substrate 21 and the lower surface of the substrate 31. The sealing portion 7 is provided between an outer peripheral portion of the array substrate 2 and an outer peripheral portion of the opposing substrate 3, and a space between the array substrate 2 and the opposing substrate 3 is sealed by the sealing portion at an outer peripheral portion of this space. Then, the liquid crystal layer 6 is included in the space which outer peripheral portion is sealed by the sealing portion.

The array substrate 2 includes the substrate 21. The opposing substrate 3 includes the substrate 31.

The substrate 31 includes an upper surface as one main surface and a lower surface as the other main surface on the opposite side of the upper surface, and it is disposed to oppose the substrate 21 such that the upper surface as the main surface of the substrate 21 and the lower surface as the main surface of the substrate 31 oppose each other. The upper surface of the substrate 31 includes a display region Ad which is apart of the region on the upper surface and a peripheral region As which is another region of the upper surface and which is a region positioned closer to an outer peripheral side of the substrate 21 than the display region Ad. Accordingly, the peripheral region As is a region on the upper surface of the substrate 31 and is a region positioned closer to an outer peripheral side of the substrate 31 than the peripheral region As. Alternatively, the display region Ad and the peripheral region As might be included on the lower surface as the other main surface of the substrate 31.

Alternatively, the display region Ad and the peripheral region As might be included on the upper surface as one main surface of the substrate 21. At this time, the substrate 21 includes an upper surface as one main surface and the upper surface of the substrate 21 includes a display region Ad and a peripheral region As which is a region positioned closer to the outer peripheral side of the substrate 21 than the display region Ad. Accordingly, the peripheral region As is a region on the upper surface of the substrate 21 and is a region positioned closer to the outer peripheral side of the substrate 21 than the display region Ad.

Figure 7:
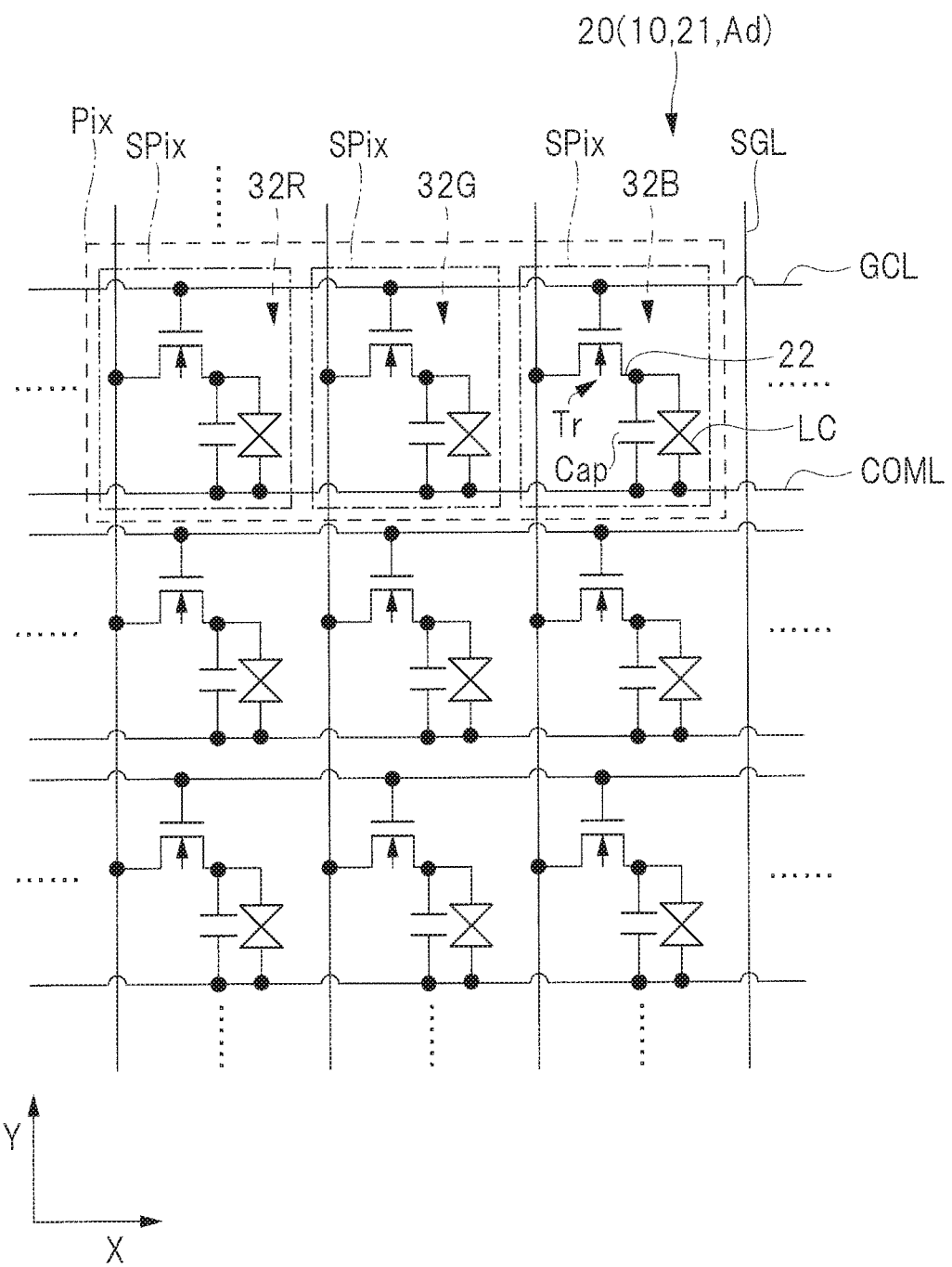
FIG. 7 is a circuit diagram showing a display device with touch detection functions of the display according to the first embodiment.
Figure 8:
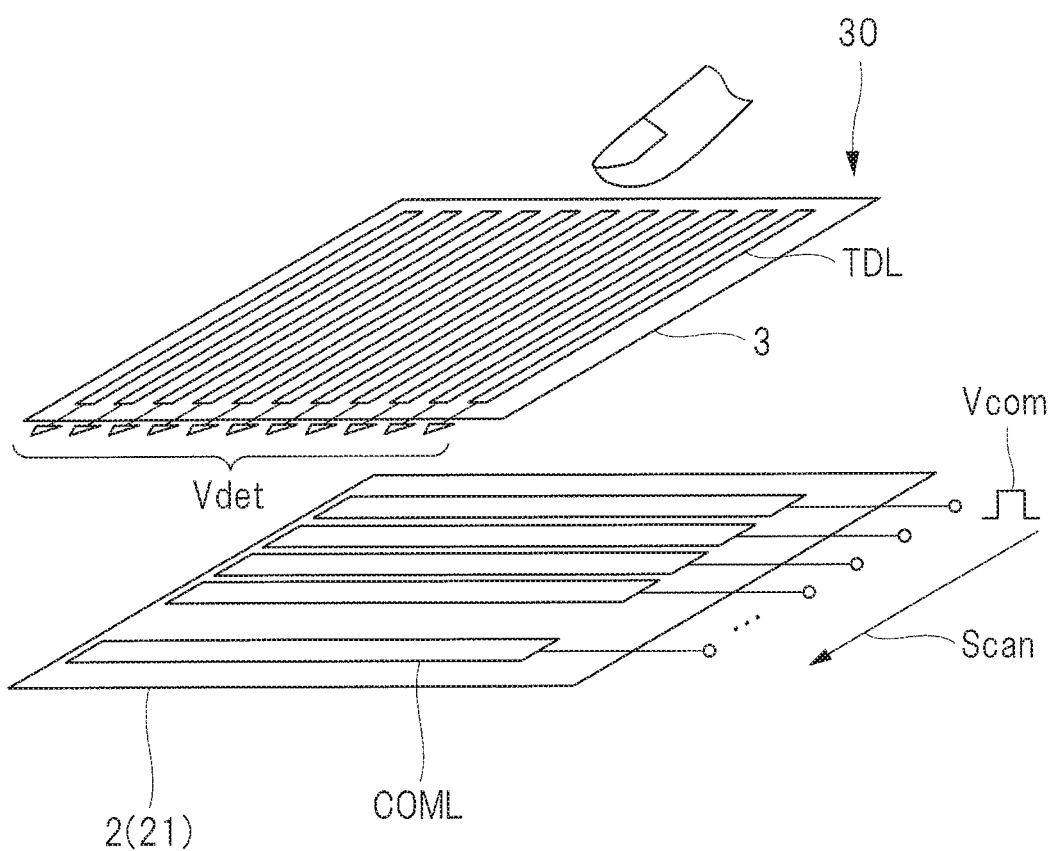
FIG. 8 is a perspective view showing one configuration example of driving electrodes and detecting electrodes of the display according to the first embodiment.

As shown in FIG. 7, in the display region Ad, the substrate 21 is formed with a plurality of scanning lines GCL, a plurality of signal lines SGL and a plurality of TFT elements Tr which are thin film transistors (TFT). In this respect, in FIG. 6, illustration of the scanning lines GCL, the signal lines SGL and the TFT elements TR is omitted. Further, the scanning lines indicate gate wirings and the signal lines indicate source wirings.

As shown in FIG. 7, each of the plurality of scanning lines GCL extends in the X axis direction and is aligned in the Y axis direction in the display region Ad. Each of the plurality of signal lines SGL extends in the Y axis direction and is aligned in the X axis direction in the display region Ad. Accordingly, each of the plurality of signal lines SGL intersects the plurality of scanning lines GCL in a plan view. In this manner, sub-pixels SPix are disposed at intersections of the plurality of scanning lines GCL and the plurality of signal lines SGL intersecting with each other in a plan view and a single pixel Pix is formed by a plurality of sub-pixels SPix of different colors. Namely, the plurality of sub-pixels SPix are provided on the upper surface of the substrate 21 and are disposed within the display region Ad in a plan view and aligned in a matrix-like form in the X axis direction and the Y axis direction.

The TFT elements Tr are formed at intersecting portions at which each of the plurality of scanning lines GCL and each of the plurality of signal lines SGL intersect with each other in a plan view. Accordingly, in the display region Ad, the plurality of TFT elements Tr are formed on the substrate 21, and the plurality of TFT elements Tr are aligned in a matrix-like form in the X axis direction and the Y axis direction. Namely, each of the plurality of sub-pixels SPix is provided with a TFT element Tr. In addition to the TFT elements Tr, each of the plurality of sub-pixels SPix is provided with a liquid crystal element LC.

The TFT elements Tr are made up, for instance, of a thin film transistor as a MOS (metal oxide semiconductor) of n-channel type. Gate electrodes of the TFT elements Tr are connected to the scanning lines GCL. Either one of a source electrode or a drain electrode of the TFT element Tr is connected to the scanning line GCL. The other one of the source electrode or the drain electrode of the TFT element Tr is connected to one end of the liquid crystal element LC via a pixel electrode 22. The liquid crystal element LC is arranged in that one end thereof is connected to the drain electrode or the source electrode of the TFT element TR while the other end is connected to the driving electrode COML.

As shown in FIG. 6, the array substrate 2 includes the substrate 21, the plurality of driving elements COML, an insulating film 24 and the plurality of pixel electrodes 22. The plurality of driving electrodes COML are provided on the substrate 21 on the upper surface as one main surface of the substrate 21 within the display region Ad in a plan view. The insulating film 24 is formed on the upper surface of the substrate 21 including surfaces of each of the plurality of driving electrodes COML. In the display region Ad, the plurality of pixel electrodes 22 are formed on the insulating film 24. Accordingly, the insulating film 24 electrically insulates the driving electrodes COML and the pixel electrodes 22.

As shown in FIG. 7, the plurality of pixel electrodes 22 are formed in each of the plurality of sub-pixels SPix aligned in a matrix-like form in the X axis direction and the Y axis direction within the display region Ad in a plan view. Accordingly, the plurality of pixel electrodes 22 are aligned in a matrix-like form in the X axis direction and the Y axis direction.

In the example shown in FIG. 6, each of the plurality of driving electrodes COML is formed between the substrate 21 and the pixel electrodes 22. Further, as schematically shown in FIG. 7, each of the plurality of driving electrodes COML is provided to overlap the plurality of pixel electrodes 22 in a plan view. Then, by applying voltage between each of the plurality of pixel electrodes 22 and each of the plurality of driving electrodes COML such that an electric field is formed between each of the plurality of pixel electrodes 22 and each of the plurality of driving electrodes COML, namely at the liquid crystal elements LC provided in each of the plurality of sub-pixels SPix, an image is displayed in the display region Ad. At this time, a capacity Cap is formed between the driving electrodes COML and the pixel electrodes 22 and the capacity Cap functions as a retention volume.

In this manner, when the display device with touch detection functions 10 includes the liquid crystal display device 20, a display control unit which controls display of images is formed by the liquid crystal elements LC, the plurality of pixel electrodes 22, the driving electrodes COML, the plurality of scanning lines GCL and the plurality of signal lines SGL. The display control unit controls display of images in the display region Ad by controlling voltage applied between the each of the pixel electrodes 22 and the driving electrodes COML. The display control unit is provided between the array substrate 2 and the opposing substrate 3.

In this respect, each of the respective driving electrodes COML might also be formed on the opposite side of the substrate 21 with the pixel electrodes 22 being interposed therebetween. In the example shown in FIG. 6, the arrangement of the driving electrodes COML and the pixel electrodes 22 is a FFS (Fringe Field Switching) mode as a horizontal field mode in which the driving electrodes COML and the pixel electrodes 22 overlap in a plan view. However, the arrangement might also be an IPS (In Plane Switching) mode as a horizontal field mode in which the driving electrodes COML and the pixel electrodes 22 do not overlap in a plan view (the same applies for the second embodiment and the third embodiment).

The liquid crystal layer 6 is to demodulate light passing therethrough in accordance with states of the electric field, and a liquid crystal layer corresponding to the horizontal field mode such as the above-described FFS mode or the IPS mode is used. Namely, a liquid crystal device of the horizontal electric field mode such as the FFS mode or the IPS mode is used as the liquid crystal display device 20. In this respect, there might be respectively provided oriented films between the liquid crystal layer 6 and the array substrate 2 and between the liquid crystal layer 6 and the opposing substrate 3 shown in FIG. 6 (the same applies for the second embodiment and the third embodiment.

As shown in FIG. 7, the plurality of sub-pixels SPix which are aligned in the X axis direction, namely the plurality of sub-pixels SPix which belong to the same row of the liquid crystal display device 20 are connected to each other by means of the scanning lines GCL. The scanning lines GCL are connected to the gate driver 12 (see FIG. 1) and are supplied with the scanning signals Vscan (see FIG. 1) by the gate driver 12. Further, the plurality of sub-pixels SPix which are aligned in the Y axis direction, namely the plurality of sub-pixels SPix which belong to the same column of the liquid crystal display device 20 are connected to each other by means of the signal lines SGL. The signal lines SGL are connected to the source driver 13 (see FIG. 1) and are supplied with pixel signals Vpix (see FIG. 1) by the source driver 13.

The driving electrodes COML are connected to the driving electrode driver 14 (see FIG. 5) and are supplied with driving signals Vcom (see FIG. 1) by the driving electrode driver 14. That is, in the example shown in FIG. 7, the plurality of sub-pixels SPix which belong to the same row share one driving electrode COML in common. The plurality of driving electrodes COML respectively extend in the X axis direction and are aligned in the Y axis direction in the display region Ad. As described above, since the plurality of scanning lines GCL respectively extend in the X axis direction and are aligned in the Y axis direction in the display region Ad, the direction each of the plurality of driving electrodes COML extends is parallel to the direction each of the plurality of scanning lines GCL extends. However, the direction each of the plurality of driving electrodes COML extends is not limited, and the direction each of the plurality of driving electrodes COML extends might, for instance, be a direction which is parallel to the direction each of the plurality of signal electrodes SGL extends.

The gate driver 12 as shown in FIG. 1 sequentially selects one row, namely one horizontal line, from among the sub-pixels SPix which are formed in a matrix-like form in the liquid crystal display device 20 as an object of display driving by applying scanning signals Vscan to the gate electrodes of the TFT elements Tr of each of the sub-pixels SPix by means of the scanning lines GCL shown in FIG. 7. The source driver 13 shown in FIG. 1 supplies pixel signals Vpix to each of the plurality of sub-pixels SPix which includes one horizontal line sequentially selected by the gate driver 12 by means of the signal lines SGL shown in FIG. 7. Then, displays in accordance with supplied pixel signals Vpix are made at the plurality of sub-pixels SPix which include one horizontal line.

The driving electrode driver 14 shown in FIG. 1 applies driving signals Vcom to drive the driving electrodes COML for each detection block corresponding to one or a plurality of driving electrodes COML.

In the liquid crystal display device 20, sub-pixels SPix are sequentially selected by each horizontal line by driving the gate driver 12 to perform sequential scanning of the scanning lines GCL on time division basis. In the liquid crystal display device 20, the source driver 13 supplies pixel signals Vpix to the sub-pixels SPix which belong to one horizontal line, and as a result, displays are made by each horizontal line. In performing these display operations, the driving electrode driver 14 applies driving signals Vcom to a detection block including the driving electrodes COML corresponding to the horizontal line.

The driving electrodes COML of the display 1 according to the first embodiment operate as driving electrodes of the liquid crystal display device 20 and also operate as driving electrodes of the touch detection device 30. FIG. 8 is a perspective view showing one configuration example of the driving electrodes and the detecting electrodes of the display according to the first embodiment.

The touch detection device 30 includes a plurality of driving electrodes COML which are provided on the array substrate 2 and a plurality of detecting electrodes TDL which are provided on the opposing substrate 3. Each of the plurality of detecting electrodes TDL extends in the direction which intersects with the direction each of the plurality of driving electrodes COML extends in a plan view. In other words, each of the plurality of detecting electrodes TDL is provided to intersect with each of the plurality of driving electrodes COML at intervals with respect to each other in a plan view. Further, each of the plurality of detecting electrodes TDL opposes the driving electrodes COML in a direction perpendicular to the upper surface of the substrate 21 included in the array substrate 2. In other words, each of the plurality of driving electrodes COML is provided to overlap each of the plurality of detecting electrodes TDL in a plan view. Further, each of the plurality of detecting electrodes TDL is respectively connected to the touch detecting signal amplification unit 42 (see FIG. 1) of the touch detection unit 40.

Electrostatic capacity is generated at intersecting portions of each of the plurality of driving electrodes COML and each of the plurality of detecting electrodes TDL in a plan view. Input positions are detected based on the electrostatic capacities between each of the plurality of driving electrodes COML and each of the plurality of detecting electrodes TDL. Namely, a detection unit which detects input positions, namely an input device is formed by the electrode substrate such as the substrate 31 formed with the detecting electrodes TDL (see FIG. 6) and the driving electrodes COML.

With such a configuration, when performing touch detection operations in the touch detection device 30, the driver electrode driver 14 sequentially selects one detection block corresponding to one or a plurality of driving electrodes COML in a scanning direction Scan. Then, in the selected detection block, the driver electrodes COML are input with driving signals Vcom for measuring the electrostatic capacities between the driving electrodes COML and the detecting electrodes TDL, and detecting signals Vdet are output from the detecting electrodes TDL for detecting input positions. In this manner, the touch detection device 30 is arranged in that touch detection is performed for each detection block. That is, one detection block corresponds to the driving electrodes E1 of the above-described touch detection principle, and the detecting electrodes TDL correspond to the detecting electrodes E2.

In this respect, the range of the detection block at the time of display operations and the range of the detection block at the time of touch detection operations might be either the same or different.

As shown in FIG. 8, the plurality of driving electrodes COML and the plurality of detecting electrodes TDL which intersect with each other in a plan view form an electrostatic capacity type touch sensor aligned in a matrix-like form. Accordingly, by scanning the entire touch detection surface of the touch detection device 30, it is possible to detect positions which have been contacted or approached by a finger or the like.

In this respect, the touch detection device 30 is not limited to the touch detection device 30 of mutual capacity method provided with common electrodes which operate as driving electrodes and with detecting electrodes. It is, for instance, possible to apply a touch detection device 30 of self-capacity method provided with detecting electrodes only as the touch detection device 30, as it will be explained using FIG. 22 and FIG. 23 to be described later. In the self-capacity method, when the detecting electrodes TDL are disconnected from the detection circuit and are electrically connected to a power source, electric charge is accumulated in the detecting electrodes TDL. Next, when the detecting electrodes TDL are disconnected from the power source and are electrically connected to the detecting circuit, electric charge flowing out to the detection circuit is detected. Namely, the detection unit detects input positions based on respective electrostatic capacities of the plurality of detecting electrodes TDL.

Here, when a finger has contacted or approached the detecting electrodes TDL, electrostatic capacities of the detecting electrodes TDL change due to the capacity of the finger, and when the detecting electrodes TDL are connected to the detection circuit, the electric charge flowing out to the detection circuit changes. Accordingly, it is possible to determine whether a finger has contacted or approached the detecting electrodes TDL or not by measuring the electric charge flowing out by means of the detection circuit and by detecting changes in electrostatic capacities of the detecting electrodes TDL.

As shown in FIG. 6, the opposing substrate 3 includes the substrate 31, a color filter layer 32, a conductive pattern CB1 and a protection layer 33.

As described above, the substrate 31 includes the upper surface as the main surface and the lower surface as the main surface on the opposite side of the upper surface. The color layer 32 is provided on the lower surface of the substrate 31. The conductive pattern CB1 is provided on the upper surface of the substrate 31. The conductive pattern CB1 includes a plurality of detecting electrodes TDL as electrodes. Each of the plurality of detecting electrodes TDL is a detecting electrode of the touch detection device 30 (see FIG. 1) and is formed on the upper surface of the substrate 31 within the display region Ad in a plan view. The protection layer 33 is provided on the upper surface of the substrate 31 to cover the plurality of detecting electrodes TDL.

For instance, a color filter layer colored in three colors of red (R), green (G) and blue (B) is aligned in the X axis direction as the color filter layer 32. With this arrangement, as shown in FIG. 7, a plurality of sub-pixels SPix corresponding to each of color regions 32R, 32G and 32B of the three colors of R, G and B is formed, and one pixel Pix is formed by the plurality of sub-pixels SPix corresponding to each of a single group of the color regions 32R, 32G and 32B. The pixels Pix are aligned in a matrix-like form along the direction the scanning lines GCL extend (X axis direction) and the direction the signal lines SGL extend (Y axis direction). The region in which the pixels Pix are aligned in a matrix-like form is, for instance, the above-described display region Ad. In this respect, it is also possible that a dummy region provided with dummy pixels is provided in the periphery of the display region Ad.

The combination of colors of the color filter layer 32 might be another combination of a plurality of colors including colors other than R, G and B. It is also possible to provide no color filter layer 32 at all. Alternatively, one pixel Pix might include a sub-pixel SPix which is not provided with the color filter layer 32, that is, a white-colored sub-pixel SPix. It is also possible that the color filter layer is provided on the substrate 2 through COA (color filter on array) technique.

The conductive pattern CB1 including a plurality of detecting electrodes TDL is made of a low resistance material having a lower specific resistance than a specific resistance of a transparent conductive material which is transparent with respect to visible light such as ITO or IZO. Further, the sheet resistance of the conductive pattern CB1 made of the low resistance material is not more than 8 Ω/square. In this case, it is possible to discharge static electricity without the necessity of increasing the thickness of the conductive pattern CB1 that much when compared to a case the conductive pattern CB1 including the plurality of detecting electrodes TDL is made of a transparent conductive material such as ITO or IZO. Accordingly, it is possible to easily discharge static electricity to the exterior of the display device with touch detection functions 10 while preventing images displayed in the display region Ad from being colored yellow. In this respect, the unit of sheet resistance Ω/square is the same unit as Ω/□.

The sheet resistance of the conductive pattern CB1 is preferably not less than 0.04 Ω/square. When the sheet resistance of the conductive pattern CB1 is less than 0.04 Ω/square, it might happen that the thickness of the conductive pattern CB1 becomes too large.

While explanations will be made using FIG. 11, FIG. 12 and Table 1 to be described later, the ratio of the total sum of areas of portions of the plurality of the sub-pixels SPix that overlap the conductive pattern CB1 in a plan view to the total sum of the areas of the plurality of sub-pixels SPix is 1 to 22%. With this arrangement, it is possible to make the transmittance with respect to visible light be not less than 90% and to improve an S/N ratio of detecting signals of touch detection when the conductive pattern CB1 is used as detecting electrodes TDL.

The protection layer 33 has a larger thickness TH1 than the thickness TH2 of the conductive pattern CB1. With this arrangement, it is possible to cover the conductive pattern CB1 with the protection layer 33. Further, since the distance between each of the plurality of detecting electrodes TDL included in the conductive pattern CB1 and the conductive layer 52 will become larger, the capacity CP1 (see FIG. 13 to be described later) between each of the plurality of detecting electrodes TDL and the conductive layer 52 will become small. Accordingly, it is possible to reduce electric charge accumulated between each of the plurality of detecting electrodes TDL and the conductive layer 52 when static electricity applied to the display 1 moves to the conductive layer 52.

In this respect, the thickness TH1 of the protection layer 33 is not a thickness of the protection layer 33 of a portion positioned on the detecting electrodes TDL included in the conductive pattern CB1, but indicates a thickness of the protection layer 33 of portions other than the portion positioned on the detecting electrodes TDL such as the distance between the upper surface of the substrate 31 and the upper surface of the protection layer 33.

The polarizing plate 5 includes an adhesive layer 51, a conductive layer 52, a cover layer 53, a polarizing layer 54 and a cover layer 55. The polarizing plate 5 is provided on the protection layer 33.

The polarizing layer 54 is a layer with polarizing functions. The polarizing layer 54 is made of an insulating film containing, for instance, polyvinyl alcohol (PVA) as a main component and is formed through absorption orientation of molecules of a compound containing, for instance, iodine to the PVA as the main component.

The cover layer 55 is formed on a surface of the polarizing layer 54 opposite to the protection layer 33 side to cover the surface of the polarizing layer 54 on the opposite side of the protection layer 33. The cover layer 55 contains, for instance, triacetylcellulose (TAC) as a main component. In this respect, it is also possible that a hard coat layer is formed on the cover layer 55 though not shown in the drawings. Further, the cover layer 53 is formed on the surface of the polarizing layer 54 on the protection layer 33 side to cover the surface of the protection layer 33 side. The cover layer 53 contains, for instance, TAC as a main component similarly to the cover layer 55.

The conductive layer 52 is formed on the protection layer 33 side of the cover layer 53. The conductive layer 52 has conductive functions by forming a transparent organic conductive film with respect to visible light. As it will be explained using FIG. 13 to be described later, the conductive layer 52 reduces disturbances in display of images upon application of static electricity to the surface of the polarizing plate 5. Alternatively, the conductive layer 52 prevents or restricts degradations in touch detection sensitivity upon application of static electricity to the surface of the polarizing plate 5.

The specific resistance of the conductive layer 52 is lower than the specific resistance of the protection layer 33. Namely, the specific resistance of the protection layer 33 is higher than the specific resistance of the conductive layer 52. With this arrangement, electric charge accumulated in the conductive layer 52 upon occurrence of static electricity and electrification of the conductive layer 52 can be easier distributed evenly within the conductive layer 52.

The sheet resistance of the conductive layer 52 is higher than the sheet resistance of the conductive pattern CB1. With this arrangement, it is possible to improve the S/N ratio of detecting signals Vdet.

The adhesive layer 51 is formed on the conductive layer 52 on the protection layer 33 side. The adhesive layer 51 adheres the conductive layer 52 of the polarizing plate 5 to the protection layer 33.

In this manner, the polarizing plate 5 includes a stacked film 56 in which a plurality of layers including the polarizing layer 54 made of an insulating film and the conductive layer 52 with conductivity are stacked in some order. The stacked layer 56 is provided on the protection layer 33 via the adhesive layer 51. In the example shown in FIG. 6, the conductive layer 52 is provided on the protection layer 33 via the adhesive layer 51.

In this respect, it is also possible that the polarizing plate 5 does not include the conductive layer 52. At this time, it is possible that a conductive layer which is not included in the polarizing plate 5 is formed on the protection layer 33 instead of the conductive layer 52 included in the polarizing plate 5.

<Shape and Arrangement of Detecting Electrodes>

Figure 9:
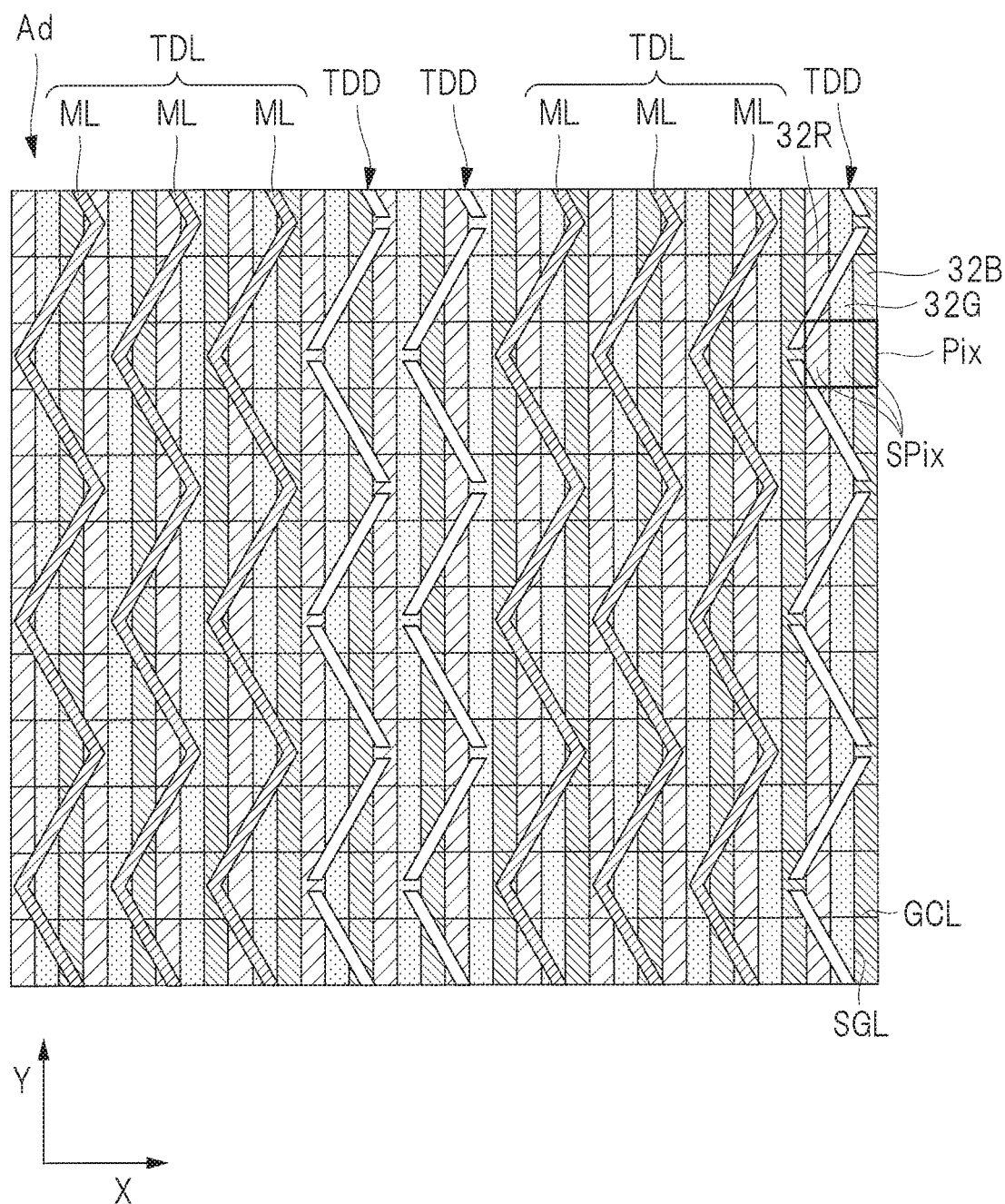
FIG. 9 is a plan view schematically showing one example of a relationship between positions of detecting electrodes and positions of pixels in the display according to the first embodiment.
Figure 10:
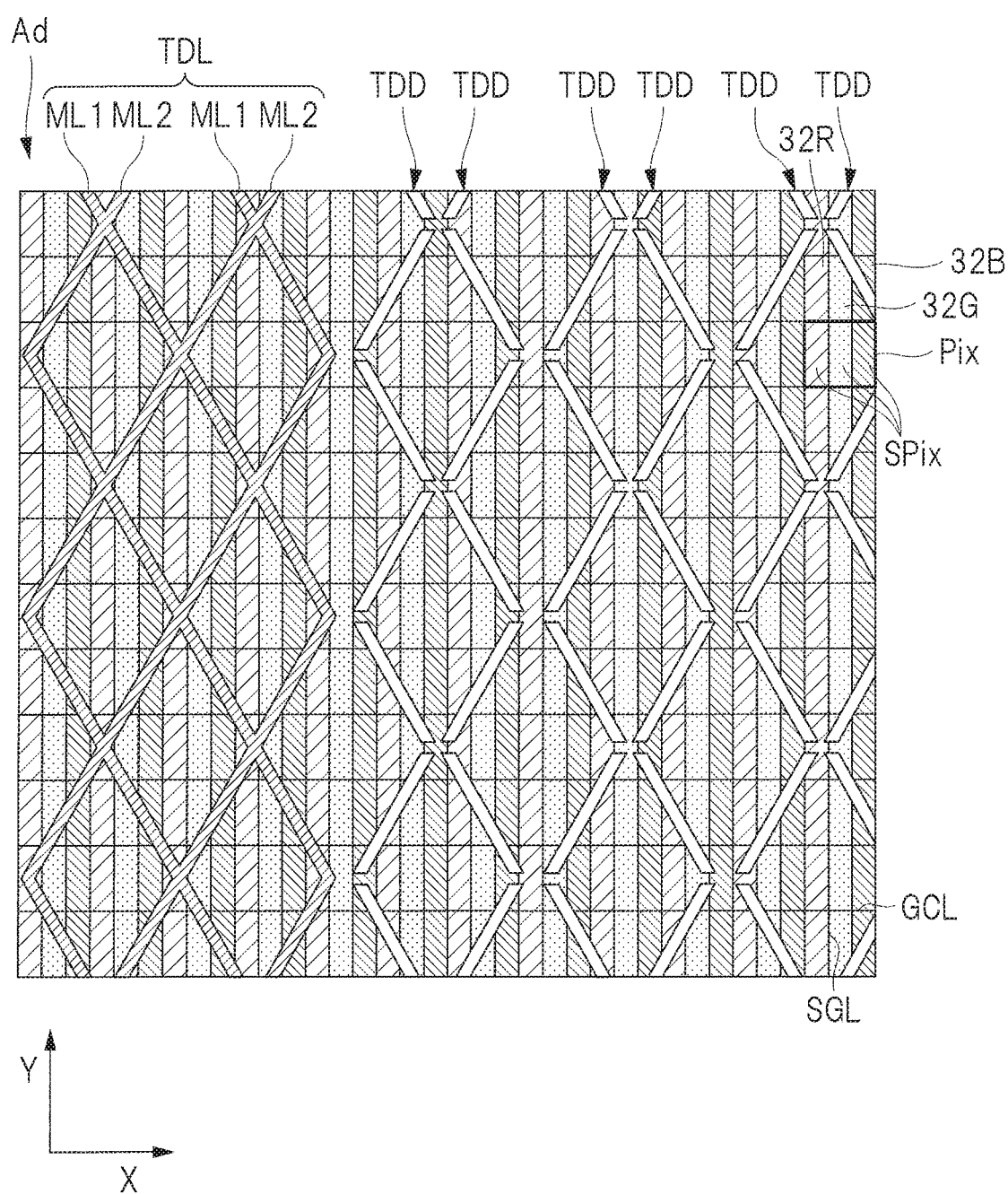
FIG. 10 is a plan view schematically showing another example of a relationship between positions of detecting electrodes and positions of pixels in the display according to the first embodiment.

Next, shapes and arrangements of the detecting electrodes will be explained with reference to FIG. 5, FIG. 6, FIG. 9 and FIG. 10. FIG. 9 is a plan view schematically showing one example of a relationship between positions of detecting electrodes and positions of pixels in the display according to the first embodiment. FIG. 10 is a plan view schematically showing another example of a relationship between positions of detecting electrodes and positions of pixels in the display according to the first embodiment.

In the example shown in FIG. 9, the plurality of pixels Pix are aligned in a matrix-like form in the X axis direction and the Y axis direction within the display region Ad. Each of the plurality of pixels Pix includes a plurality of sub-pixels SPix aligned in the X axis direction. Accordingly, each of the plurality of sub-pixels SPix is aligned in a matrix-like form in the X axis direction and the Y axis direction within the display region Ad. In the example shown in FIG. 9, the pixels Pix include three types of sub-pixel SPix displaying each of the three colors of R (red), G (green) and B (blue). Accordingly, the pixels Pix include a plurality of sub-pixels SPix respectively corresponding to each of the color regions 32R, 32G and 32B of the three colors of R, G and B. In this respect, the types of colors displayed by the sub-pixels SPix are not limited to three types. For instance, the pixels Pix might include four types of sub-pixels SPix displaying each of the four colors of R (red), G (green), B (blue) and W (white).

The plurality of sub-pixels SPix are aligned in a matrix-like form along the direction the scanning lines GCL extend (X axis direction) and the direction the signal lines SGL extend (Y axis direction). The scanning lines GCL and the signal lines SGL or light shielding portions BM1 and BM2 (see FIG. 11 to be described later) which are formed to cover the scanning lines GCL and the signal lines SGL restrict transmission of light.

In the example shown in FIG. 5 and FIG. 9, each of the plurality of detecting electrodes TDL includes three conductive lines ML. The conductive lines ML have a zigzag form extending in the Y axis direction as a whole while alternately bending in opposite directions in a plan view. The conductive lines ML are also aligned in the X axis direction in a plan view. With this arrangement, it is possible to prevent or restrict that the pattern of the scanning lines GCL or the pattern of the signal lines SGL interferes with the pattern of the detecting electrodes TDL and striped light and shade patterns such as moire patterns are observed.

As described above, the conductive pattern CB1 is made of a low resistance material having a specific resistance lower than the specific resistance of the transparent conductive material. Further, the sheet resistance of the conductive pattern CB1 made of a lower resistance material is not more than 8 Ω/square.

The conductive pattern CB1 preferably includes a metallic layer or an alloy layer. Accordingly, each of the plurality of conductive lines ML included in the conductive pattern CB1 preferably includes a metallic layer or an alloy layer as well. With this arrangement, since the conductivity of each of the plurality of conductive lines ML can be improved, it is possible to improve the detection sensitivity or the detection speed of the detecting electrodes TDL. It is further possible to easily discharge static electricity applied from the exterior of the display device with touch detection functions 10 through the conductive lines ML.

More preferably, each of the plurality of conductive lines ML includes a metallic layer or an alloy layer of one or more metal selected from a group consisting of aluminum (Al), copper (Cu), silver (Ag), molybdenum (Mo), chrome (Cr) and tungsten (W). With this arrangement, since the conductivity of each of the plurality of conductive lines ML can be improved, the detection sensitivity or the detection speed of the detecting electrodes TDL is further improved. Static electricity applied from the exterior of the display device with touch detection functions 10 can be more easily discharged through the conductive lines ML.

Metal exhibits light shielding properties with respect to visible light. Here, the expression "exhibit light shielding properties with respect to visible light" indicates that the transmittance with respect to visible light is, for instance, not more than 10%. Accordingly, the transmittance with respect to visible light of each of the plurality of conductive lines ML including a metallic layer or an alloy layer might be not more than 10%. As it will be described later, in the first embodiment, the ratio of the total sum of areas of portions of the plurality of the sub-pixels SPix that overlap either the plurality of detecting electrodes TDL or the plurality of dummy electrodes TDD in a plan view to the total sum of the areas of the plurality of sub-pixels SPix is 1 to 22%. In such a case, it is possible to make the transmittance of the display region Ad as a whole, namely the transmittance of the display 1 to be not less than 90% even if the transmittance with respect to visible light of the plurality of conductive lines ML themselves is not more than 10%.

As shown in FIG. 5, each of the plurality of detecting electrodes TDL includes connecting portions CNB1 and connecting portions CNT1. The connecting portions CNB1 electrically connect end portions of adjoining conductive lines ML on one side (lower side in FIG. 5) in the Y axis direction. The connecting portions CNT1 electrically connect end portions of adjoining conductive lines ML on an opposite side of the one side (upper side in FIG. 5) in the Y axis direction. The connecting portions CNB1 are connected to the touch detection unit 40 shown in FIG. 1 via the routing wirings WRT. Accordingly, the plurality of conductive lines ML which are included in the detecting electrodes TDL are connected to the touch detection unit 40 shown in FIG. 1 via the connecting portions CNB1 and the routing wirings WRT.

In this manner, each of the plurality of detecting electrodes TDL may include a plurality of conductive lines ML which are aligned in the X axis direction and which are connected in parallel with each other. Since the electric resistance of the detecting electrodes TDL can be reduced with this arrangement, the detecting sensitivity or the detecting speed when performing detection operations with the detecting electrodes TDL can be improved.

As shown in FIG. 9, the conductive pattern CB1 preferably includes a plurality of detecting electrodes TDL and a plurality of dummy electrodes TDD. Each of the plurality of dummy electrodes TDD is provided, for instance, between two detecting electrodes TDL formed apart from each other. Each of the plurality of dummy electrodes TDD is formed such that conductive lines having a zigzag form extending in the Y axis direction as a whole while alternately bending in opposite directions in a plan view are cut and divided at respective bending portions. With this arrangement, it is possible to prevent or restrict that the pattern of the scanning lines GCL or the pattern of the signal lines SGL interferes with the pattern of the dummy electrodes TDD and striped light and shade patterns such as moire patterns are observed.

As described above, the conductive pattern CB1 is made of a low resistance material having a specific resistance lower than the specific resistance of the transparent conductive material, and preferably, the conductive pattern CB1 includes a metallic layer or an alloy layer. Accordingly, each of the plurality of dummy electrodes TDD included in the conductive pattern CB1 preferably includes a metallic layer or an alloy layer as well. Namely, the dummy electrodes TDD might also include a metallic layer or an alloy layer of of the same type as the metallic layer or the alloy layer included in the conductive lines ML. Accordingly, it is possible to prevent or restrict occurrence of irregularities in brightness of the entire display region Ad caused by dummy electrodes TDD being formed in regions where no detecting electrodes TDL with light shielding properties are formed, and it is possible to prevent or restrict identification of detecting electrodes TDL.

On the other hand, also in the example shown in FIG. 10, the plurality of pixels Pix are aligned in a matrix-like form in the X axis direction and the Y axis direction within the display region Ad similarly to the example shown in FIG. 9. Further, the pixels Pix include a plurality of sub-pixels SPix respectively corresponding to each of the color regions 32R, 32G and 32B of the three colors of R (red), G (green) and B (blue). Accordingly, the plurality of sub-pixels SPix are aligned in a matrix-like form in the X axis direction and the Y axis direction within the display region Ad.

Also in the example shown in FIG. 10, the plurality of sub-pixels SPix are aligned in a matrix-like form along a direction the scanning lines GCL extend (X axis direction) and a direction the signal lines SGL extend (Y axis direction) similarly to the example shown in FIG. 9. The scanning lines GCL and the signal lines SGL or light shielding portions BM1 and BM2 which are formed to cover the scanning lines GCL and the signal lines SGL (see FIG. 11 to be described later) restrict transmission of light.

In the example shown in FIG. 10, each of the plurality of detecting electrodes TDL includes two conductive lines ML1 and two conductive lines ML2 and has a mesh-like shape. Each of the conductive lines ML1 and the conductive lines ML2 has a zigzag form which extends in the Y axis direction as a whole while alternately bending in opposite directions in a plan view. The conductive lines ML1 and the conductive lines ML2 adjoin each other in the X axis direction. Further, portions of the conductive lines ML1 and the conductive lines ML2 which adjoin each other in the X axis direction which are bent in mutually opposite directions are coupled with each other. With this arrangement, it is possible to prevent or restrict that the pattern of the scanning lines GCL or the pattern of the signal lines SGL interferes with the pattern of the detecting electrodes TDL and striped light and shade patterns such as moire patterns are observed.

The plurality of conductive lines ML1 and the plurality of conductive lines ML2 in the example shown in FIG. 10 might also include a metallic layer or an alloy layer of the same type as the metallic layer or the alloy layer included in the conductive lines ML shown in the example shown in FIG. 9. Further, also in the example shown in FIG. 10, the plurality of conductive lines ML1 and the plurality of conductive lines ML2 might be electrically connected by means of the connecting portions CNB1 (see FIG. 5) and the connecting portions CNT1 (see FIG. 5) similarly to the example shown in FIG. 9.

Also in the example shown in FIG. 10, the display 1 according to the first embodiment includes a plurality of dummy electrodes TDD similarly to the example shown in FIG. 9. Each of the plurality of dummy electrodes TDD is provided, for instance, between two detecting electrodes TDL formed apart from each other. Each of the plurality of dummy electrodes TDD is formed such that conductive lines having a zigzag form extending in the Y axis direction as a whole while alternately bending in opposite directions in a plan view are cut and divided at respective bending portions. With this arrangement, it is possible to prevent or restrict that the pattern of the scanning lines GCL or the pattern of the signal lines SGL interferes with the pattern of the dummy electrodes TDD and striped light and shade patterns such as moire patterns are observed.

Also in the example shown in FIG. 10, the dummy electrodes TDD might also include a metallic layer or an alloy layer of the same type as the metallic layer or the alloy layer included in the conductive lines ML1 and the conductive lines ML2 similarly to the example shown in FIG. 9. Accordingly, it is possible to prevent or restrict occurrence of irregularities in brightness of the entire display region Ad caused by dummy electrodes TDD from being formed in regions where no detecting electrodes TDL with light shielding properties are formed, and it is possible to prevent or restrict identification of detecting electrodes TDL.

In this respect, the detecting electrodes TDL might also have a shape of a pattern other than the zigzag shape or the mesh-like shape which has certain regularly in its arrangement but of a pattern with no periodicity at all and which can be filled. One example of such a shape might be a pattern formed by linking atom positions of quasi-crystals having no translational symmetry defining crystals but with high orders in the atom arrangement.

<Area Ratios of Detecting Electrodes and Dummy Electrodes>

Figure 11:
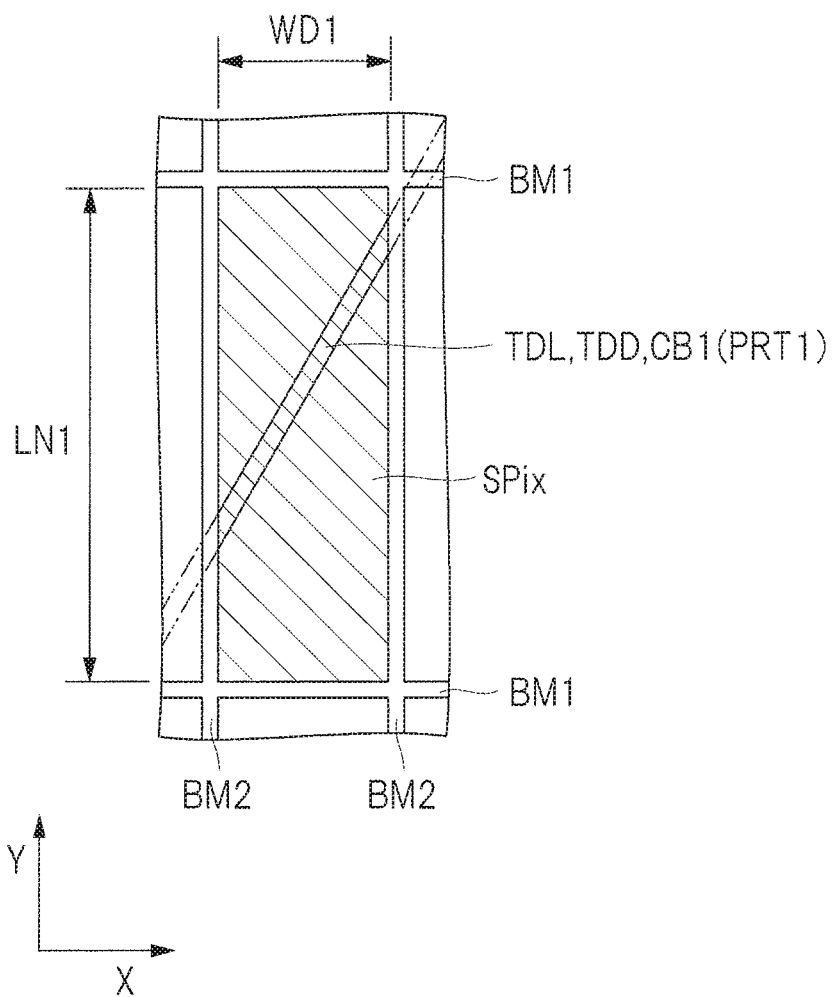
FIG. 11 is a plan view schematically showing one example of a relationship between positions of sub-pixels and positions of detecting electrodes in the display according to the first embodiment.

FIG. 11 is a plan view schematically showing one example of a relationship between positions of sub-pixels and positions of detecting electrodes in the display according to the first embodiment.

As shown in FIG. 11, sub-pixels SPix which overlap either one of the plurality of detecting electrodes TDL or the plurality dummy electrodes TDD in a plan view from among the sub-pixels SPix will be considered. A width of a sub-pixel SPix in the X axis direction is defined to be width WD1 while a length of the sub-pixel SPix in the Y axis direction is defined to be length LN1. The width WD1 of the sub-pixel SPix in the X axis direction is defined to be smaller than the length LN1 of the sub-pixel SPix in the Y axis direction. At this time, an area S1 of a sub-pixel SPix is given by the following equation (1):

$$S1 = WD1 \times LN1 \qquad (1)$$

On the other hand, an area of a portion PRT1 of a sub-pixel SPix which overlaps either of the plurality of detecting electrodes TDL or the plurality dummy electrodes TDD in a plan view is defined to be an area S2, and an a ratio of the area S2 with respect to the area S1 of the sub-pixel SPix is defined to be a ratio R1. At this time, the ratio R1 is given by the following equation (2):

$$R1 = S2/S1 \qquad (2)$$

In this respect, as shown in FIG. 11, the display 1 (see FIG. 5) includes a plurality of light shielding portions BM1 and a plurality of light shielding portions BM2. Each of the plurality of light shielding portions BM1 is formed to overlap the scanning lines GCL (see FIG. 7) in a plan view, extends in an X axis direction and has light shielding properties with respect to visible light. Each of the plurality of light shielding portions BM2 is formed to overlap the signal lines SGL (see FIG. 7) in a plan view, extends in a Y axis direction and has light shielding properties with respect to visible light. The plurality of light shielding portions BM1 and the plurality of light shielding portions BM2 intersect with each other in a plan view, and the plurality of light shielding portions BM1 and the plurality of light shielding portions BM2 which intersect with each other in a plan view have a lattice-like form. Each of the plurality of sub-pixels SPix is divided by the plurality of light shielding portions BM1 and the plurality of light shielding portions BM2 which intersect with each other in a plan view and which have a lattice-like form. Accordingly, the area S1 of the sub-pixel SPix indicates an area of a region which is surrounded by the light shielding portion BM1 and the light shielding portion BM2, and does not include the area of the light shielding portion BM1 and the area of the light shielding portion BM2.

The area S2 of a sub-pixel SPix which does not overlap any of the plurality of detecting electrodes TDL and which does not overlap any of the plurality of dummy electrodes TDD will be zero. Accordingly, the ratio R1 which is given by the above equation (2) will be zero.

In the entire display region Ad, the total sum of areas S1 of each of the plurality of sub-pixels SPix aligned in a matrix-like form in the X axis direction and the Y axis direction is defined to be an area S3. Then, in the entire display region Ad, the total sum of areas of portions PRT1 of the plurality of sub-pixels SPix which overlap the conductive pattern CB1 including the plurality of detecting electrodes TDL and the plurality of dummy electrodes TDD in a plan view is defined to be an area S4, and a ratio of the area S4 with respect to the area S3 is defined to be an area ratio R2. At this time, the area ratio R2 is given by the following equation (3):

$$R2 = S4/S3 \quad (3)$$

In the display 1 according to the first embodiment, the area ratio R2 given by the above equation (3) is 1 to 22%. Namely, in the display 1 according to the first embodiment, the ratio of the total sum of areas of portions of the plurality of sub-pixels SPix that overlap the conductive pattern CB1 including the plurality of detecting electrodes TDL and the plurality of dummy electrodes TDD in a plan view to the total sum of the areas of the plurality of sub-pixels SPix is 1 to 22%. With this arrangement, the transmittance of the entire display region Ad, namely the transmittance of the display 1 can be made to be not less than 90% even when the transmittance with respect to visible light of the plurality of conductive lines ML themselves is not more than 10%. It is further possible to prevent or restrict that detected values of the detecting signals Vdet (see FIG. 4) become small. Accordingly, it is possible to improve the transmittance of the display region with respect to visible light in a display including an input device and to improve the detection performance of the input device.

In this respect, it is also possible that only the detecting electrodes TDL are provided while the dummy electrodes TDD are not provided in the display region Ad. Namely, the conductive pattern CB1 might include the detecting electrodes TDL only. At this time, the area S2 will be an area of a portion PRT1 of a sub-pixel SPix which overlaps any of the plurality of detecting electrodes TDL in a plan view, and the area S4 will be a total sum of areas of portions PRT1 of the plurality of sub-pixels SPix which overlap any of the plurality of detecting electrodes TDL in a plan view. The area ratio R2 is a ratio of the total sum of areas of portions of the plurality of sub-pixels SPix which overlap any of the plurality of detecting electrodes TDL in a plan view to the total sum of areas of the plurality of sub-pixels SPix. Further, also in case no dummy electrodes TDD are provided and only the detecting electrodes TDL are provided, the area ratio R2 is similarly 1 to 22%. Namely, a preferable range for the area rate R2 of the conductive pattern CB1 incase only the detecting electrodes TDL are provided while no dummy electrodes TDD are provided is the same as the preferable range for the area rate R2 of the conductive pattern CB1 in case the detecting electrodes TDL and the dummy electrodes TDD are provided.

A preferable range of the area ratio of the detecting electrodes TDL in case of the display 1 of the first embodiment, namely when the detecting electrodes TDL include the conductive lines ML having a zigzag shape, will now be explained. Here, a plurality of displays were provided such that area ratios R2 is ranged from 0.49 to 24.58%. The displays were used to evaluate transmittance in the display regions Ad, detected values of the detecting signals and visibility.

Cases with area ratios R2 of less than 1% were defined to be Comparative Examples 1 to 3, cases with area ratios R2 of 1 to 22% were defined to Examples 1 to 25 and cases with area ratios R2 exceeding 22% were defined to be Comparative Examples 4 to 6. For evaluating visibility, evaluations were made whether the visibility was favorable without any problems in images displayed in the display region Ad by visible light being reflected by the detecting electrodes TDL or the dummy electrodes TDD or not, namely whether the reflection appearance was favorable or not.

More specifically, it was evaluated whether the detecting electrodes TDL or the dummy electrodes TDD were visible in stripe-like form, namely in linear form, namely whether reflection stripes were observed in images displayed in the display regions AD due to the fact that visible light was reflected by the detecting electrodes TDL or the dummy electrodes TDD when the detecting electrodes TDL had a zigzag form. The evaluation results are shown in Table 1. The relationships between area ratio and detected value in Table 1 are shown in the graph of FIG. 12. The horizontal axis of FIG. 12 shows the area ratio R2 while the longitudinal axis of FIG. 12 shows the detected values.

TABLE 1

|  | AREA RATIO (%) | TRANS-MITTANCE (%) | DETECTED VALUE (a.u.) | VISIBILITY EVALUATION |
| --- | --- | --- | --- | --- |
| COMPARATIVE EXAMPLE 1 | 0.49 | 99.8 | 54 | ⊚ |
| COMPARATIVE EXAMPLE 2 | 0.78 | 99.6 | 81 | ⊚ |
| COMPARATIVE EXAMPLE 3 | 0.97 | 99.5 | 92 | ⊚ |
| EXAMPLE 1 | 1.04 | 99.5 | 101 | ⊚ |
| EXAMPLE 2 | 1.11 | 99.4 | 115 | ⊚ |
| EXAMPLE 3 | 1.23 | 99.4 | 120 | ⊚ |
| EXAMPLE 4 | 1.34 | 99.3 | 121 | ⊚ |
| EXAMPLE 5 | 1.55 | 99.2 | 122 | ⊚ |
| EXAMPLE 6 | 1.92 | 99.0 | 120 | ⊚ |
| EXAMPLE 7 | 2.11 | 99.2 | 124 | ⊚ |
| EXAMPLE 8 | 2.43 | 98.8 | 121 | ⊚ |
| EXAMPLE 9 | 2.52 | 98.6 | 123 | ⊚ |
| EXAMPLE 10 | 3.71 | 98.3 | 123 | ⊚ |
| EXAMPLE 11 | 4.29 | 98.2 | 120 | ⊚ |
| EXAMPLE 12 | 4.89 | 97.9 | 120 | ⊚ |
| EXAMPLE 13 | 5.13 | 97.4 | 123 | ○ (REFLECTION STRIPE) |
| EXAMPLE 14 | 5.91 | 97.7 | 121 | ○ (REFLECTION STRIPE) |
| EXAMPLE 15 | 6.99 | 97.5 | 122 | ○ (REFLECTION STRIPE) |
| EXAMPLE 16 | 8.06 | 97.2 | 124 | ○ (REFLECTION STRIPE) |
| EXAMPLE 17 | 9.48 | 96.4 | 120 | ○ (REFLECTION STRIPE) |
| EXAMPLE 18 | 10.31 | 95.8 | 123 | ○ (REFLECTION STRIPE) |
| EXAMPLE 19 | 10.89 | 95.3 | 121 | ○ (REFLECTION STRIPE) |

TABLE 1-continued

|  | AREA RATIO (%) | TRANS-MITTANCE (%) | DETECTED VALUE (a.u.) | VISIBILITY EVALUATION |
|---|---|---|---|---|
| EXAMPLE 20 | 11.41 | 95.2 | 120 | Δ (REFLECTION STRIPE) |
| EXAMPLE 21 | 12.58 | 94.2 | 123 | Δ (REFLECTION STRIPE) |
| EXAMPLE 22 | 14.99 | 93.5 | 121 | Δ (REFLECTION STRIPE) |
| EXAMPLE 23 | 17.65 | 91.8 | 122 | Δ (REFLECTION STRIPE) |
| EXAMPLE 24 | 19.61 | 91.1 | 124 | Δ (REFLECTION STRIPE) |
| EXAMPLE 25 | 21.88 | 90.3 | 125 | Δ (REFLECTION STRIPE) |
| COMPARATIVE EXAMPLE 4 | 22.13 | 89.9 | 124 | Δ (REFLECTION STRIPE) |
| COMPARATIVE EXAMPLE 5 | 23.78 | 89.1 | 122 | Δ (REFLECTION STRIPE) |
| COMPARATIVE EXAMPLE 6 | 24.58 | 88.7 | 123 | Δ (REFLECTION STRIPE) |

In Table 1, when no reflection stripes were observed in the images displayed in the display region Ad and the visibility of the images was favorable, it was marked with a double circle. When some reflection stripes were observed in the images displayed in the display region Ad but the reflection stripes did not stand out and the visibility of the images was acceptable, it was marked with a circle (reflection stripe)". When reflection stripes were observed in the images displayed in the display region Ad, the reflection stripes stood out and the visibility of the images was not acceptable, it was marked with a triangle (reflection stripe).

As shown in Table 1, when the area ratio R2 is 0.49 to 24.58% (Comparative Examples 1 to 3, Examples 1 to 25 and Comparative Examples 4 to 6), the transmittance of the display region Ad reduces accompanying increases in the area ratio R2. Namely, accompanying increases in the ratio of the total sum of areas of portions of the plurality of sub-pixels SPix which overlap any of the conductive pattern CB1 including the plurality of detecting electrodes TDL and the plurality of dummy electrodes TDD in a plan view to the total sum of areas of the plurality of sub-pixels SPix, the transmittance of the display region Ad is degraded. On the other hand, it is desirable that the transmittance of the display region Ad is not less than 90%. Accordingly, the area ratio R2 is preferably not more than 22%.

Figure 12:
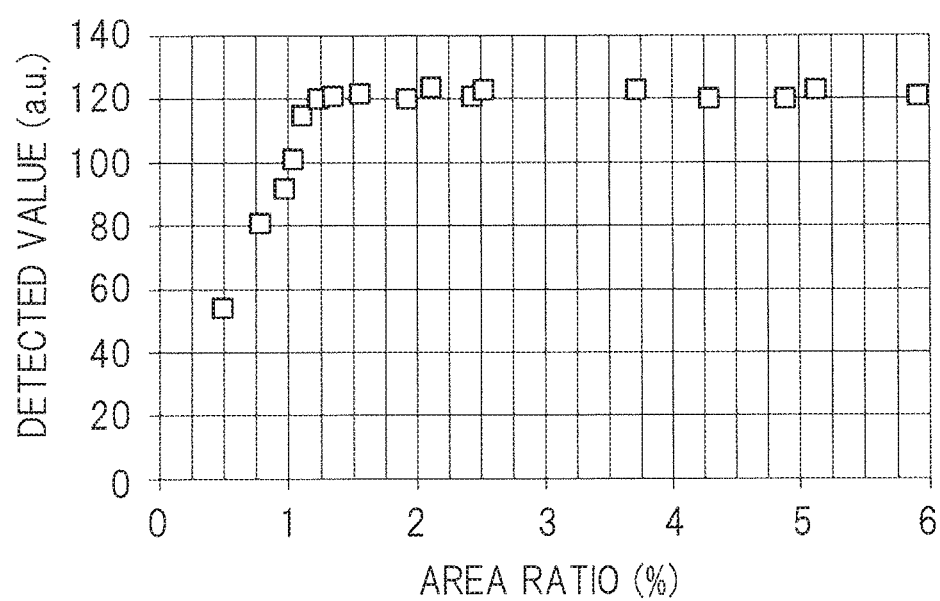
FIG. 12 is a graph showing relationships between area ratio and detected values in Table 1.

Further, as shown in Table 1 and FIG. 12, when the area ratio R2 is 1.2 to 24.58% (Examples 3 to 25 and Comparative Examples 4 to 6), the detected values are not dependent on the area ratio R2 and are constant. This is considered to be due to the fact that differentials of electrostatic capacity between the conductive lines ML and the driving electrodes COML due to presence/absence of touches are not dependent on the area ratio R2 but are constant when the area ratio R2 is 1.2 to 24.58%.

However, when the area ratio R2 is not less than 1.0% and less than 1.2% (Examples 1 and 2), the detected values start to reduce accompanying reductions in the area ratio R2, and when the area ratio R2 is not less than 0.49% and less than 1.0% (Comparative Examples 1 to 3), the detected values abruptly reduce accompanying reductions in the area ratio R2. This is considered to be due to the fact that the electrostatic capacity between the conductive lines ML and the driving electrodes COML is reduced due to reduction of the area ratio R2, so that the strength of the detecting signals Vdet becomes small.

Moreover, as shown in Table 1, when the area ratio is 0.49 to 5% (Comparative Examples 1 to 3 and Examples 1 to 12), no reflection stripes are observed in images displayed in the display region Ad, and the visibility is favorable. When the area ratio exceeds 5% and is not more than 11% (Examples 13 to 19), some reflection stripes are observed in images displayed in the display region Ad but the reflection stripes do not stand out and the visibility is acceptable. When the area ratio exceeds 11% (Examples 20 to 25 and Comparative Examples 4 to 6), reflection stripes are observed in images displayed in the display region Ad and the reflection stripes stand out, and the visibility is not acceptable.

From the results of the Comparative Examples 1 to 3, the Examples 1 to 25 and the Comparative Examples 4 to 6, the ratio of the total sum of areas of portions of the plurality of sub-pixels SPix which overlap any of the plurality of detecting electrodes TDL and the plurality of dummy electrodes TDD in a plan view to the total sum of areas of the plurality of sub-pixels SPix, namely the area ratio R2 is preferably 1 to 22%.

When the area ratio R2 is less than 1%, it might happen that the detected values of the detecting signals Vdet are extremely small. Further, when the area ratio R2 exceeds 22%, it might happen that the transmittance of the display region Ad becomes less than 90%. On the other hand, by defining the area ratio R2 to be 1 to 22%, it is possible to make the transmittance in the display region Ad be not less than 90% while the detected values of the detecting signals Vdet become not too small. Accordingly, in a display including an input device, it is possible to improve the transmittance of the display region with respect to visible light and to improve the detection performance of the input device.

Further, when the detecting electrodes TDL include conductive lines ML with a zigzag form, the area ratio R2 is more preferably 1 to 11%. With this arrangement, it is possible to prevent and restrict that reflection stripes are observed in images displayed in the display region Ad and that the visibility of images is deteriorated.

When the detecting electrodes TDL include conductive lines ML with a zigzag form, the area ratio R2 is even more preferably 1.2 to 5%. With this arrangement, it is possible to further prevent and restrict that reflection stripes are observed in images displayed in the display region Ad and that the visibility of images is deteriorated.

In this respect, in Examples 1 to 25 and Comparative Examples 1 to 6, the area ratio R2 was changed in a state the ratio of the area of the detecting electrodes TDL and the area of the dummy electrodes TDD was set to 1:2. On the other hand, the same results as the above-described results were obtained also when the ratio of the area of the detecting electrodes TDL and the area of the dummy electrodes TDD was changed to various values. Further, also when no dummy electrodes TDD were provided and only the detecting electrodes TDL were provided, the same results as the above-described results were obtained. Accordingly, the preferable range for the area ratio R2 in case no dummy electrodes TDD are provided and the conductive pattern CB1 including only the detecting electrodes TDL is provided is the same as the preferable range for the area ratio R2 in case the conductive pattern CB1 including the detecting electrodes TDL and the dummy electrodes TDD is provided.

<Movements of Static Electricity in Display Device with Touch Detection Functions>

Figure 13:
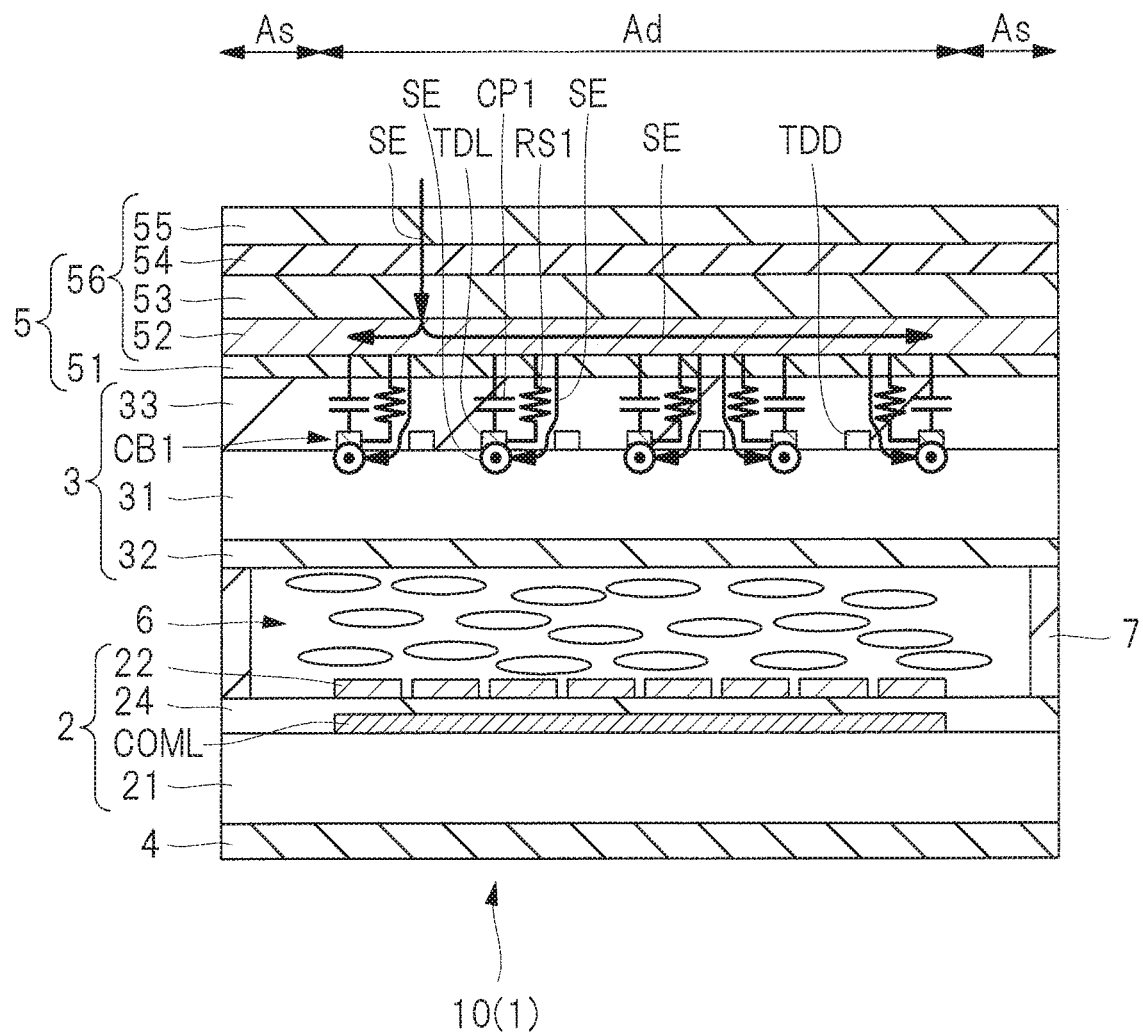
FIG. 13 is a sectional view schematically showing movements of static electricity in the display device with touch detection functions of the display according to the first embodiment.

Next, movements of static electricity in the display device with touch detection functions 10 will be explained. FIG. 13 is a sectional view schematically showing movements of static electricity in the display device with touch detection functions of the display according to the first embodiment.

In the display device with touch detection functions 10, upon application of static electricity SE to, for instance, the cover layer 55 which is the surface of the polarizing plate 5 from the exterior of the display device with touch detection functions 10, the static electricity SE is first moved to the conductive layer 52 through the cover layer 55, the polarizing layer 54 and the cover layer 53. When the static electricity SE is moved to the conductive layer 52, the static electricity SE is disposed in the conductive layer 52 depending on the distribution of the plurality of capacities CP1 respectively formed between each of the plurality of detecting electrodes TDL and the conductive layer 52. Thereafter, the static electricity SE is moved to each of the plurality of detecting electrodes TDL through the protection layer 33 having a resistance RS1.

The static electricity SE moved to each of the plurality of detecting electrodes TDL is then moved through the detecting electrodes TDL, the routing wirings WRT, the terminal unit TM and the wiring substrate WS (see FIG. 5). The static electricity SE moved through the wiring substrate WS is then moved to a grounding line or the like of the display device with touch detection functions 10 through a resistance RS0 connected to an input terminal of the touch detection unit 40 (see FIG. 1) or an ESD (Electro-Static Discharge) protection circuit (not shown). With this arrangement, it is possible to discharge static electricity SE applied to the display device with touch detection functions 10 to the exterior of the display device with touch detection functions 10.

When the conductive layer 52 is not provided, it might happen that, for instance, the surface of the polarizing plate 5 is charged through static electricity applied from the exterior of the display device with touch detection functions 10 and that the oriented state of liquid crystal molecules of the liquid crystal layer 6 is disturbed by an electric field caused through the static electricity, thereby causing disturbances in display of images.

On the other hand, since static electricity applied to the display device with touch detection functions 10 from the exterior thereof can be easily discharged to the exterior of the display device with touch detection functions 10 by providing the conductive layer 52, it is possible to reduce disturbances in display of images upon application of static electricity to the display device with touch detection functions 10.

The conductive layer 52 is preferably disposed to cover the surface of the opposing substrate 3 in the entire region of the display region Ad as shown in FIG. 6. With this arrangement, since static electricity applied to the display device with touch detection functions 10 can be easily discharged to the exterior of the display device with touch detection functions 10 in the entire region of the display region Ad, it is possible to easily reduce disturbances in display of images upon application of static electricity to the display device with touch detection functions 10.

The conductive layer 52 might also be disposed to cover the upper surface of the substrate 31 included in the opposing substrate 3 in a region including the entire region of the display region Ad. For instance, the conductive layer 52 might be disposed to cover a circuit provided on the upper surface of the substrate 31 (not shown) included in the opposing substrate 3 in the peripheral region As. With this arrangement, it is possible to prevent breakdown of the circuit provided on the upper surface of the substrate 31 included in the opposing substrate 3 in the peripheral region As, also in case static electricity is applied to the display device with touch detection functions 10 at the time of manufacture. Further, it is possible to reduce malfunctions of the circuit provided on the upper surface of the substrate 31 included in the opposing substrate 3 in the peripheral region As, also in case static electricity is applied to the display device with touch detection functions 10 at the time of use.

It is desirable that the resistance of the conductive layer 52 is sufficiently low such that static electricity moved to the conductive layer 52 can be easily disposed within the conductive layer 52 in accordance with the distribution of the plurality of capacities CP1 respectively formed between each of the plurality of detecting electrodes TDL and the conductive layer 52. Namely, from a standpoint of ESD measures, there is an upper limit value for the resistance of the conductive layer 52.

For instance, when the sheet resistance of the conductive layer 52 exceeds $1 \times 10^{13}$ Ω/square, static electricity moved to the conductive layer 52 cannot be easily disposed within the conductive layer 52 in accordance with the distribution of the plurality of capacities CP1. Accordingly, it is desirable that the sheet resistance of the conductive layer 52 is not more than $1 \times 10^{13}$ Ω/square. With this arrangement, static electricity can be easily moved within the conductive layer 52, so that static electricity moved to the conductive layer 52 is easily disposed within the conductive layer 52 in accordance with the distribution of the plurality of capacities CP1 respectively formed between each of the plurality of detecting electrodes TDL and the conductive layer 52.

On the other hand, when the resistance of the conductive layer 52 is too low, it might happen that the touch detection sensitivity is degraded. As shown in FIG. 8, the display device with touch detection functions 10 detects touch using the fact that electrostatic capacities between the driving electrodes COML and the detecting electrodes TDL change by means of an object approaching from the exterior. Accordingly, when the resistance of the conductive layer 52 disposed between the detecting electrodes TDL and the object approaching from the exterior is too low, the conductive layer 52 will function as a shield and the above-described electrostatic capacity will be hardly changed through the object approaching from the exterior. In other words, touch components indicative of presence/absence of touch will be attenuated by the shield in the detecting signals Vdet, so that the S/N ratio and thus the touch detection sensitivity are degraded. In this manner, from a standpoint of touch detection sensitivity, there is a lower limit value for the resistance of the conductive layer 52.

In order to prevent attenuation of the detecting signals Vdet by the conductive layer 52, namely, in order to set a high S/N ratio, it is necessary to make the change in voltage of the conductive layer 52 to be sufficiently small when the detecting signals Vdet change in accordance with transitions of the driving signals Vcom, for instance, as shown in FIG.

4. Here, the larger a time constant τ of the conductive layer 52 is, the smaller the change in voltage of the conductive layer 52 will be. Accordingly, in order to set a high S/N ratio for the detecting signals Vdet, it is necessary that the time constant τ of the conductive layer 52 is sufficiently large.

For instance, when the sheet resistance of the conductive layer 52 is not more than the sheet resistance of the conductive pattern CB1, the S/N ratio for the detecting signals Vdet remarkably decreases. Accordingly, it is preferable that the sheet resistance of the conductive layer 52 is higher than the sheet resistance of the conductive pattern CB1. With this arrangement, it is possible to improve the S/N ratio for the detecting signals Vdet.

Further, also in case the sheet resistance of the conductive layer 52 is higher than the sheet resistance of the conductive pattern CB1, it might happen that the S/N ratio for the detecting signals Vdet is decreased and that the time constant τ of the conductive layer 52 becomes small when the sheet resistance of the conductive layer 52 is less than $1\times10^8$ Ω/square. Accordingly, it is more preferable that the sheet resistance of the conductive layer 52 is not less than $1\times10^8$ Ω/square. With this arrangement, it is possible to reliably increase the S/N ratio of the detecting signals Vdet.

Accordingly, the sheet resistance of the conductive layer 52 is preferably $1\times10^8$ to $1\times^{13}$ Ω/square.

In this respect, as described above, effects on the S/N ratio of the conductive layer 52 will be the same irrespective of the touched portion within the display region Ad when the conductive layer 52 is disposed to cover the upper surface of the substrate 31 included in the opposing substrate 3 in the entire region of the display region Ad. With this arrangement, it is possible to reduce variations in touch detection sensitivity depending on positions of touch in the display device with touch detection functions 10.

<Relationship Between Easiness of Mobility of Static Electricity and Transmittance>

Figure 14:
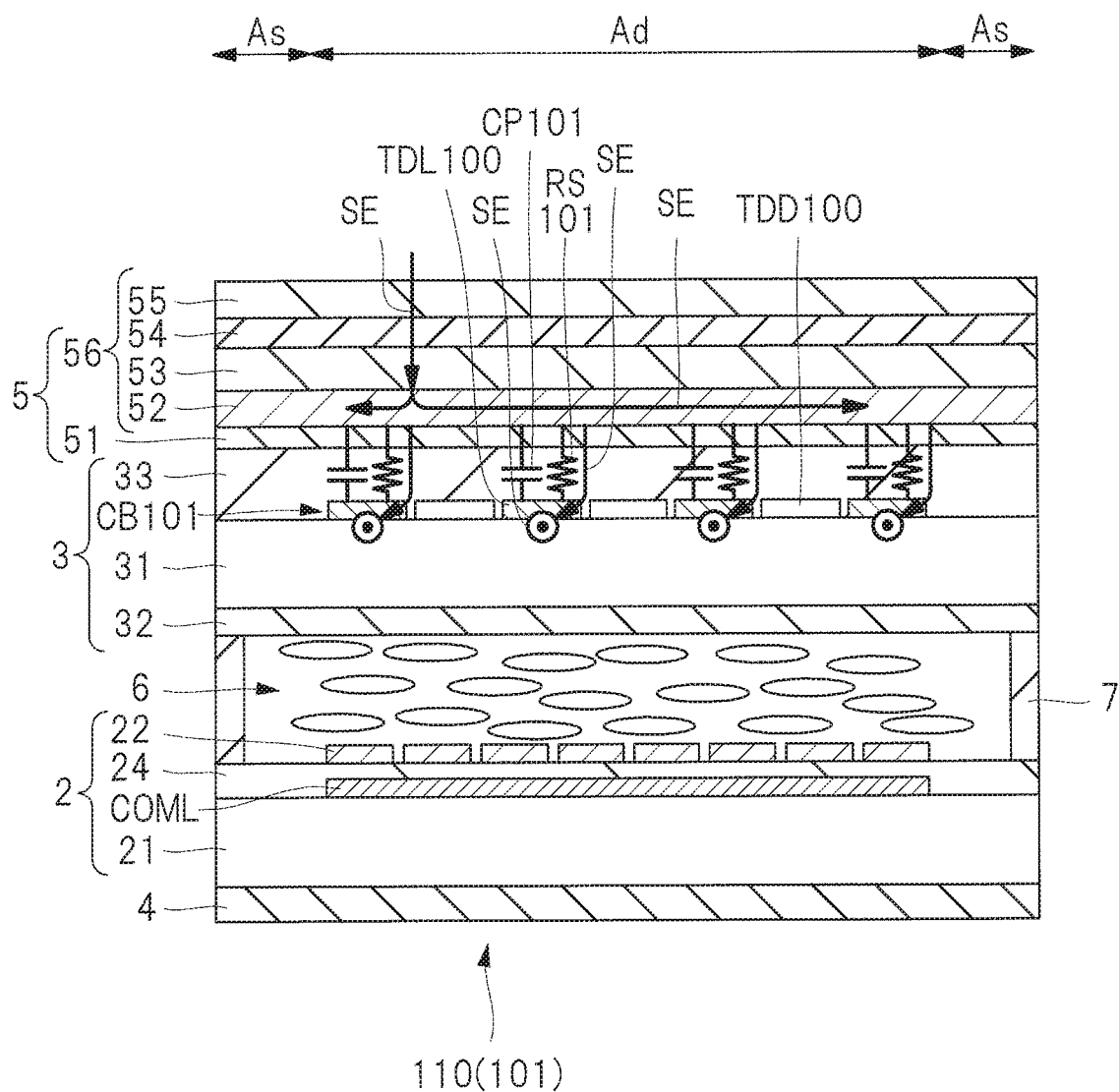
FIG. 14 is a sectional view schematically showing movements of static electricity in the display device with touch detection functions of the display of Comparative Example 7.
Figure 15:
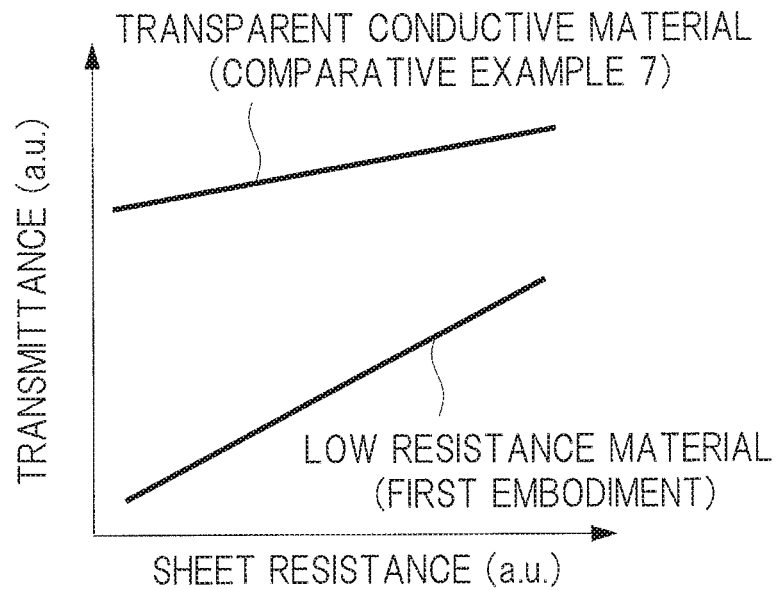
FIG. 15 is a graph schematically showing relationships between sheet resistance of the conductive pattern and transmittance.
Figure 16:
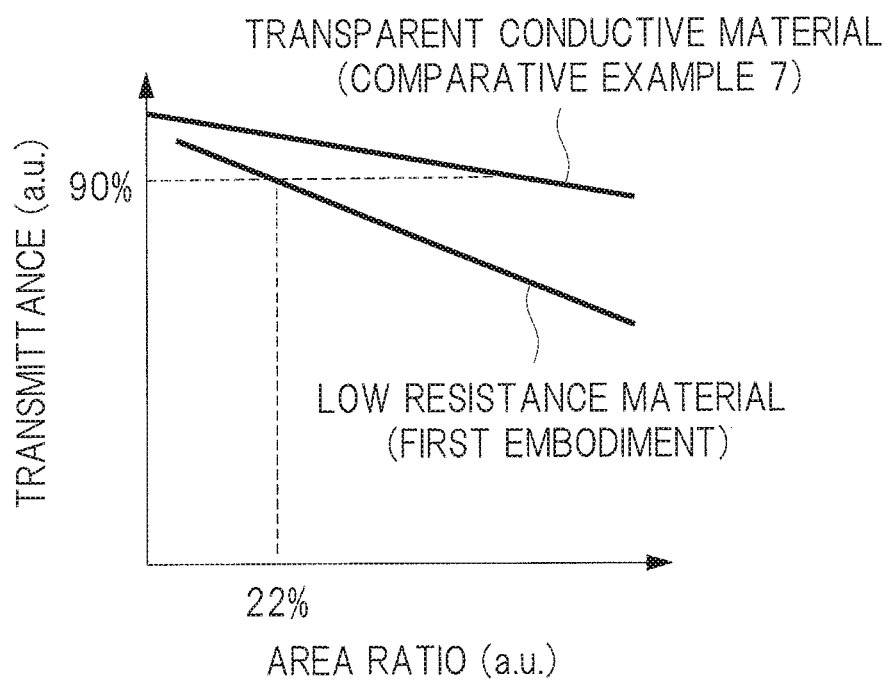
FIG. 16 is a graph schematically showing relationships between area ratio of the conductive pattern and transmittance.

Next, a relationship between easiness of mobility of static electricity applied to the display device with touch detection functions and transmittance will be explained through comparison with a display device with touch detection functions 110 of Comparative Example 7. FIG. 14 is a sectional view schematically showing movements of static electricity in the display device with touch detection functions of the display of Comparative Example 7. FIG. 15 is a graph schematically showing relationships between sheet resistance of the conductive pattern and transmittance. FIG. 16 is a graph schematically showing relationships of area ratio of the conductive pattern and transmittance. FIG. 15 and FIG. 16 show a case where the conductive pattern is made of a transparent conductive material (Comparative Example 7) and a case where the conductive pattern is made of a low resistance material having a specific resistance lower than that of the transparent conductive material (First Embodiment). In this respect, FIG. 15 shows a case in which the area ratio of a conductive pattern CB101 of Comparative Example 7 and the area ratio of the conductive pattern CB1 of the first embodiment are substantially identical.

In the display 101 of Comparative Example 7, the display device with touch detection functions 110 includes an array substrate 2, an opposing substrate 3, a polarizing plate 4, a polarizing plate 5, a liquid crystal layer 6 and a sealing portion 7. The array substrate 2, the polarizing plate 4, the polarizing plate 5, the liquid crystal layer 6 and the sealing portion 7 of the display device with touch detection functions 101 of Comparative Example 7 are the same as the array substrate 2, the polarizing plate 4, the polarizing plate 5, the liquid crystal layer 6 and the sealing portion 7 of the display 1 of the first embodiment.

On the other hand, in the display 110 of Comparative Example 7, the opposing substrate 3 includes a substrate 31, a color filter layer 32, the conductive pattern CB101 and a protection layer 33. The substrate 31, the color filter layer 32 and the protection layer 33 of the display 101 of Comparative Example 7 are the same as the substrate 31, the color filter layer 32 and the protection layer 33 of the display 1 of the first embodiment.

In the display 101 of Comparative Example 7, the conductive pattern CB101 includes a plurality of detecting electrodes TDL100 and a plurality of dummy electrodes TDD100. The conductive pattern CB101 is made of a transparent conductive material such as ITO or IZO.

Similarly to the first embodiment, upon application of static electricity SE to, for instance, the cover layer 55 which is the surface of the polarizing plate 5 from the exterior of the display device with touch detection functions 110, the static electricity SE is first moved to the conductive layer 52 through the cover layer 55, the polarizing layer 54 and the cover layer 53 also in Comparative Example 7. When the static electricity SE is moved to the conductive layer 52, the static electricity SE is disposed in the conductive layer 52 depending on the distribution of the plurality of capacities CP101 respectively formed between each of the plurality of detecting electrodes TDL100 and the conductive layer 52. Thereafter, the static electricity SE is moved to the detecting electrodes TDL100 through the protection layer 33 having a resistance RS101.

However, in the Comparative Example 7, the detecting electrodes TDL100 are made of a transparent conductive material such as ITO or IZO. The specific resistance of a transparent conductive material such as ITO or IZO is not less than ten times the specific resistance of metal such as aluminum (Al) or copper (Cu), namely higher by one digit or more. Therefore, it is not easy to lower the sheet resistance of the detecting electrodes TDL100.

Accordingly, it is difficult to move static electricity SE moved to the detecting electrodes TDL 100 to the exterior of the display device with touch detection functions 110 through the detecting electrodes TDL100. Namely, in the display device with touch detection functions 110, it is difficult to discharge static electricity SE applied to the display device with touch detection functions 110 to the exterior of the display device with touch detection functions 110.

As described above, the specific resistance of the transparent conductive material is not less than ten times the specific resistance of the low resistance material such as a metallic layer, namely higher by one digit or more. Accordingly, it is necessary to reduce the sheet resistance of the detecting electrodes TDL100 and to make the thickness of the detecting electrodes TDL100 large such that static electricity SE can be easily discharged to the exterior of the display device with touch detection functions 110 in the display device with touch detection functions 110 of Comparative Example 7. Namely, it is necessary to reduce the sheet resistance of the conductive pattern CB101 by increasing the thickness of the conductive pattern CB101 including the plurality of detecting electrodes TDL100 and the plurality of dummy electrodes TDD100 in the display device with touch detection functions 110 of Comparative Example 7.

However, as shown in FIG. 15, the more the sheet resistance of the conductive pattern CB101 is reduced, namely, the more the thickness of the conductive pattern CB101 is increased, the more the transmittance of the display device with touch detection functions 110 of Comparative Example 7 is degraded and optical properties of the display device with touch detection functions 110 are deteriorated.

Further, in Comparative Example 7, it is necessary to increase the area ratio of the detecting electrodes TDL100 for easily discharging static electricity SE to the exterior of the display device with touch detection functions 110. Namely, in the display device with touch detection functions 110 of Comparative Example 7, it is necessary to increase the area ratio of the conductive pattern CB101 including the plurality of detecting electrodes TDL100 and the plurality of dummy electrodes TDD100.

However, as shown in FIG. 16, the larger the area ratio of the conductive pattern CB101 is, the more the transmittance of the display device with touch detection functions 110 of Comparative Example 7 is degraded and optical properties of the display device with touch detection functions 110 are deteriorated.

Moreover, when the conductive pattern CB101 is made of a transparent conductive material such as ITO or IZO, ultraviolet light having a wavelength in the range of, for instance, 200 to 380 nm and purple light and blue light having a wavelength in the range of, for instance, 380 to 495 nm from among visible light are absorbed when visible light passes through the conductive pattern CB101. Therefore, when the conductive pattern CB101 is made of a transparent conductive material such as ITO or IZO, light passing through the display device with touch detection functions 110 of Comparative Example 7 is colored yellow.

Accordingly, the larger the thickness of the conductive pattern CB101 is, that is, the more the sheet resistance of the conductive pattern CB101 is degraded, the lower the transmittance of the display device with touch detection functions 110 becomes, light transmitted through the display device with touch detection functions 110 is colored yellow, and optical properties of the display device with touch detection functions 110 are deteriorated. Further, the larger the area ratio of the conductive pattern CB101 becomes, the more the transmittance of the display device with touch detection functions 110 is degraded, light transmitted through the display device with touch detection functions 110 is colored yellow, and optical properties of the display device with touch detection functions 110 are deteriorated. Accordingly, it is difficult to reduce disturbances in display of images due to static electricity without deteriorating optical properties in the display device with touch detection functions 110 of Comparative Example 7.

In this respect, when the display 101 of Comparative Example 7 does not include a touch panel as an input device, the conductive lines ML included in the conductive pattern CB101 are not detecting electrodes and input positions are not detected based on the electrostatic capacity of the conductive lines ML. However, also in such a case, when the conductive pattern CB101 is made of a transparent conductive material such as ITO or IZO, it is necessary to increase the thickness of the conductive pattern CB101 or to increase the area ratio of the conductive pattern CB101 for easily discharging static electricity through the conductive pattern CB101. However, the transmittance of the display 101 is degraded and optical properties of the display 101 are deteriorated even when the thickness of the conductive pattern CB101 is increased and the area ratio of the conductive pattern CB101 is increased. Accordingly, it is difficult to reduce disturbances in display of images due to static electricity without deteriorating optical properties.

<Main Features and Effects of the Present Embodiment>

The display device with touch detection functions 10 according to the first embodiment includes the conductive pattern CB1 provided on the surface of the substrate 31, the protection layer 33 provided on the upper surface of the substrate 31 to cover the conductive pattern CB1, and the conductive layer 52 provided on the protection layer 33. The sheet resistance of the conductive pattern CB1 is not more than 8 Ω/square. The ratio of the total sum of areas of portions of the plurality of the sub-pixels SPix that overlap the conductive pattern CB1 in a plan view to the total sum of the areas of the plurality of sub-pixels SPix is 1 to 22%. Further, the sheet resistance of the conductive layer 52 is higher than the sheet resistance of the conductive pattern CB1.

With this arrangement, static electricity applied from the exterior of the display device with touch detection functions 10 can be easily discharged to the exterior of the display device with touch detection functions 10, so that disturbances in display of images upon application of static electricity to the display device with touch detection functions 10 can be reduced. Further, it is possible to prevent breakdown of the circuit provided on the upper surface of the substrate 31 included in the opposing substrate 3 in the peripheral region As also upon application of static electricity at the time of manufacture of the display device with touch detection functions 10. Moreover, it is possible to prevent malfunctions of the circuit provided on the upper surface of the substrate 31 included in the opposing substrate 3 in the peripheral region As also upon application of static electricity at the time of using the display device with touch detection functions 10.

Also in the first embodiment, as shown in FIG. 15, the more the thickness of the conductive pattern CB1 is increased, namely the more the sheet resistance of the conductive pattern CB1 is reduced, the more the transmittance of the display device with touch detection functions 10 is degraded. Further, as described above, while the transparent conductive material is transparent with respect to visible light, metal exhibits light shielding properties with respect to visible light. Accordingly, as shown in FIG. 15, when the area ratio of the conductive pattern CB101 and the area ratio of the conductive pattern CB1 are substantially identical and the sheet resistances are also identical, the transmittance of the display device with touch detection functions 110 of Comparative Example 7 is higher than the transmittance of the display device with touch detection functions 10 of the first embodiment.

However, the specific resistance of the low resistance material of, for instance, the metallic layer is not more than 1/10 of the specific resistance of the transparent conductive material and thus lower by one digit or more. Accordingly, it is possible to easily reduce the area ratio of the conductive pattern CB1 than the area ratio of the conductive pattern CB101 also in a state the sheet resistance of the conductive pattern CB1 is lower than the sheet resistance of the conductive pattern CB101. Further, as shown in FIG. 16, the area ratio of the conductive pattern CB1 can be set to not more than 22%, and thus the transmittance of the display device with touch detection functions 10 can be set to not less than 90% as it has been described above using FIG. 11, FIG. 12 and Table 1.

In this manner, in the display device with touch detection functions 10 of the first embodiment, since the specific resistance of the low resistance material of, for instance, the metallic layer is sufficiently lower than the specific resistance of the transparent conductive material, it is not necessary to increase the thickness of the detecting electrodes TDL that much for easily discharging static electricity to the exterior of the display device with touch detection functions 10. Namely, in the display device with touch detection functions 10 of the first embodiment, it is not necessary to increase the thickness of the conductive pattern CB1 for easily discharging static electricity to the exterior of the display device with touch detection functions 10. Therefore, the transmittance of the display device with touch detection functions 10 is hardly degraded.

Further, in the display device with touch detection functions 10 of the first embodiment, since the specific resistance of the low resistance material of, for instance, the metallic layer is lower than the specific resistance of the transparent conductive material, it is not necessary to increase the area ratio of the detecting electrodes TDL for easily discharging static electricity to the exterior of the display device with touch detection functions 10. Namely, in the display device with touch detection functions 10 of the first embodiment, it is not necessary to increase the area ratio of the conductive pattern CB1 for easily discharging static electricity to the exterior of the display device with touch detection functions 10. Therefore, the transmittance of the display device with touch detection functions 10 is hardly degraded.

Accordingly, in the first embodiment, since the specific resistance of the low resistance material included in the conductive pattern CB1 is lower than the specific resistance of the transparent conductive material, it is not necessary to increase the thickness of the conductive pattern CB1 and it is not necessary to increase the area ratio of the conductive pattern CB1. Therefore, in the first embodiment, it is possible to prevent that the transmittance of the display device with touch detection functions 10 with respect to visible light is degraded to less than 90% and to prevent or restrict that visible light passing through the display device with touch detection functions 10 is colored yellow. Consequently, according to the first embodiment, it is possible to reduce disturbances of display of images due to static electricity without deteriorating optical properties.

In this respect, the display 1 of the first embodiment does not necessarily include a touch panel as an input device. In such a case, the display 1 does not include a detection unit which detects input positions and the conductive lines ML included in the conductive pattern CB1 are not detecting electrodes and input positions are not detected based on the electrostatic capacity of the conductive lines ML. However, also in such a case, according to the display of the first embodiment, it is possible to reduce disturbances of display of images due to static electricity without deteriorating optical properties.

Second Embodiment

In the first embodiment, static electricity applied from the exterior of the display device with touch detection functions is discharged to the exterior of the display through the conductive pattern provided in the display region. In contrast thereto, in the second embodiment, static electricity applied from the exterior of the display with touch detection functions is discharged to the exterior of the display through the conductive pattern provided in the display region and through the conductive pattern provided in the peripheral region.

The overall configuration of the display of the second embodiment might be the same as the overall configuration of the display of the first embodiment and explanations thereof will be omitted.

<Display Device with Touch Detection Functions>

Figure 17:
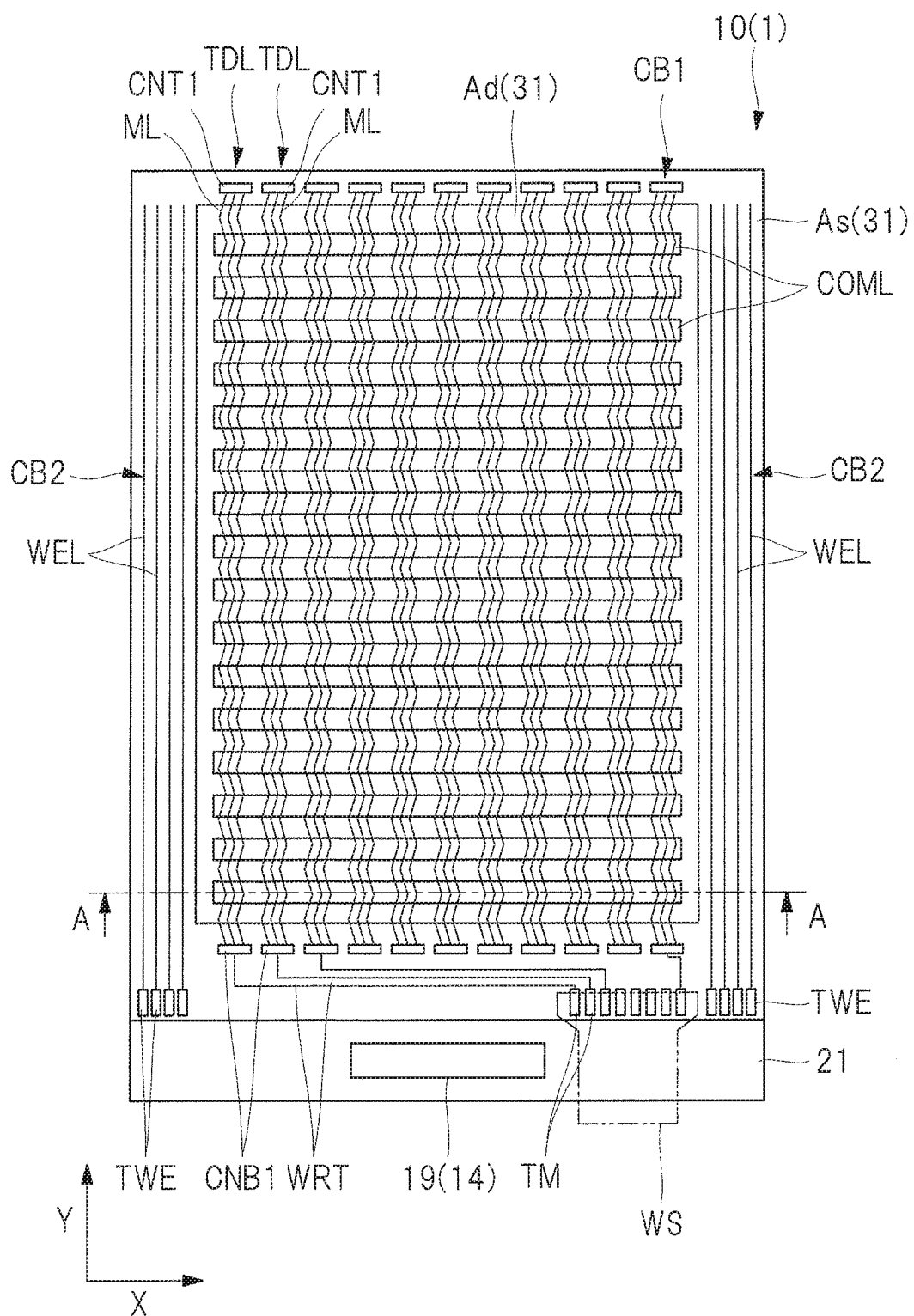
FIG. 17 is a plan view showing one example of a module mounted with a display according to a second embodiment.
Figure 18:
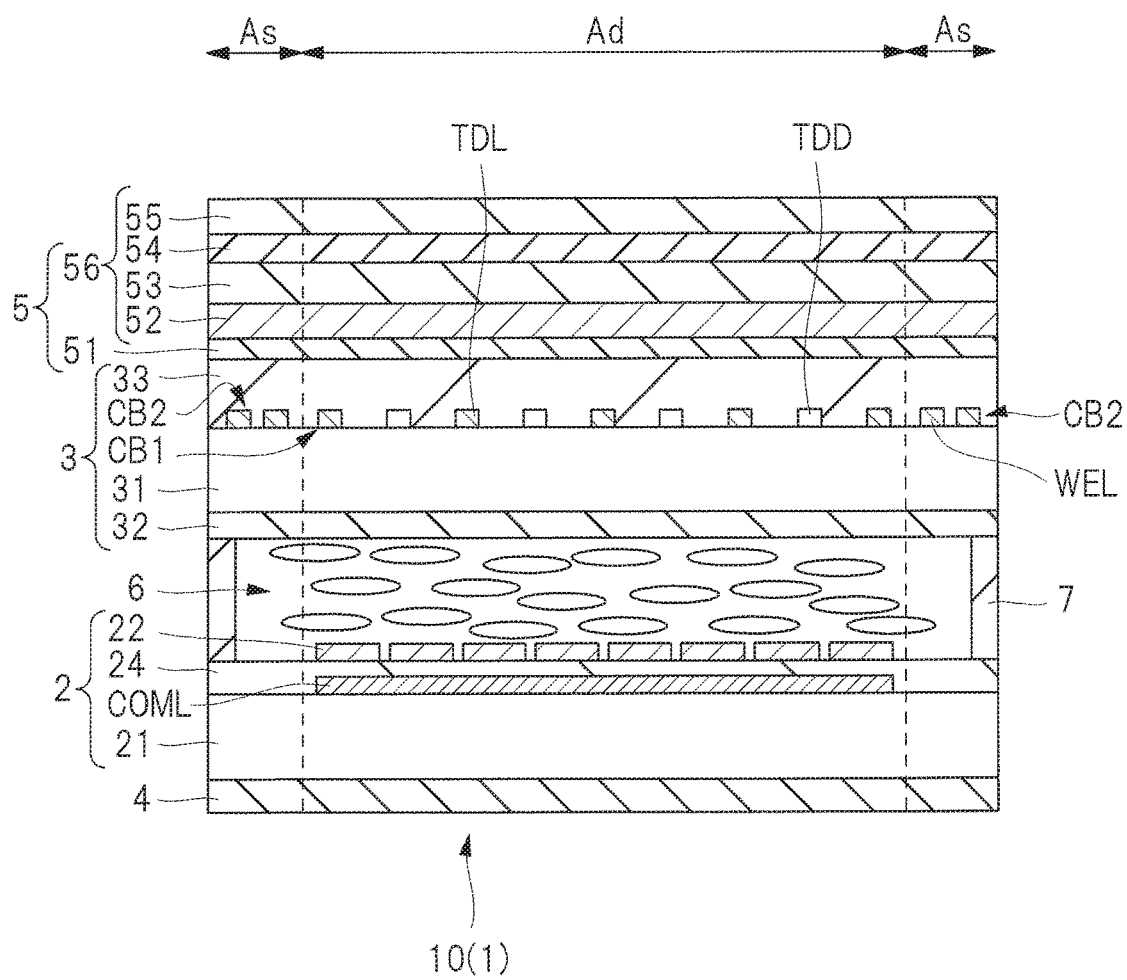
FIG. 18 is a sectional view showing a display device with touch detection functions of the display according to a second embodiment.
Figure 19:
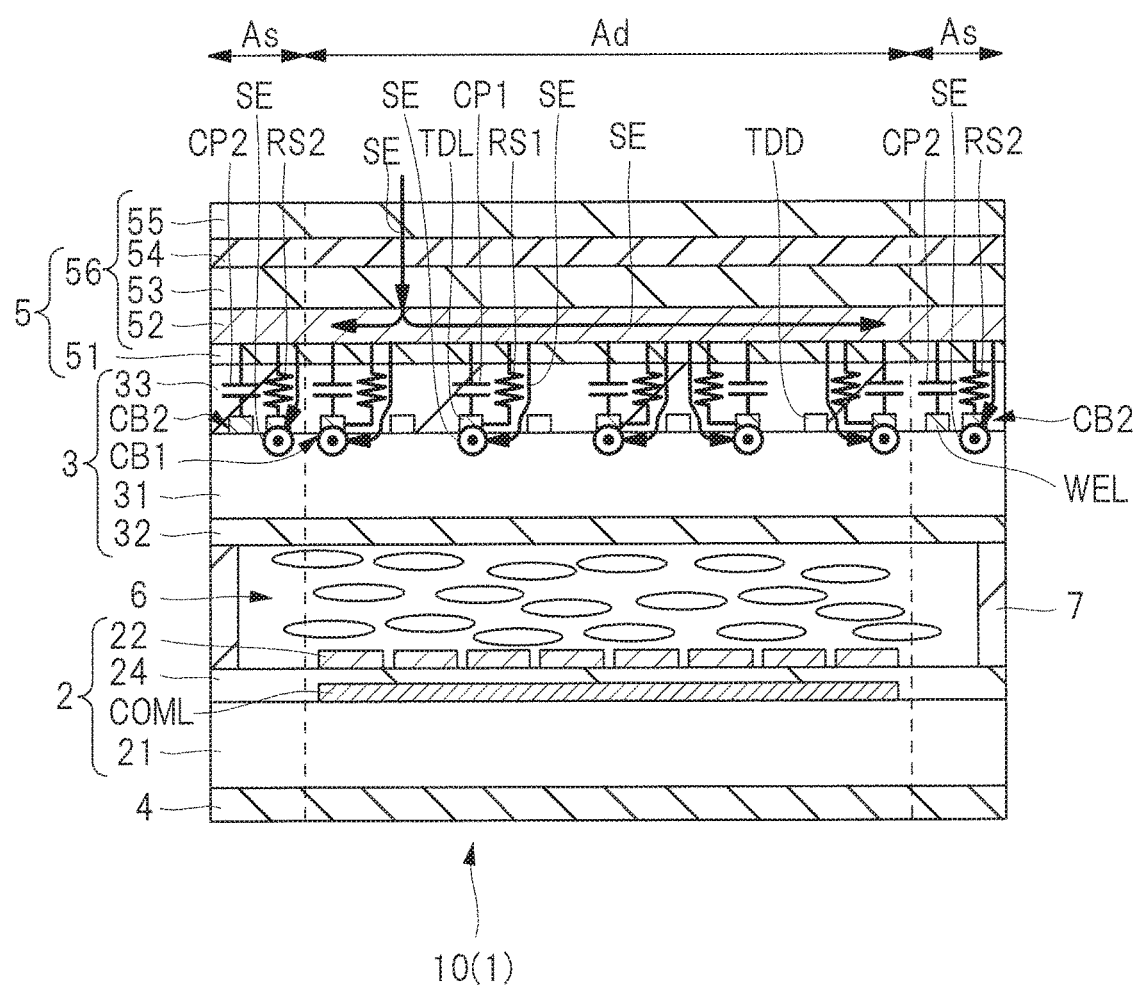
FIG. 19 is a sectional view schematically showing movements of static electricity in the display device with touch detection functions of the display according to the second embodiment.

FIG. 17 is a plan view showing one example of a module mounted with the display according to the second embodiment. FIG. 18 is a sectional view showing a display device with touch detection functions of the display according to the second embodiment. FIG. 19 is a sectional view schematically showing movements of static electricity in the display device with touch detection functions of the display according to the second embodiment. FIG. 18 and FIG. 19 are sectional views along line A-A in FIG. 17. In this respect, in FIG. 17, illustration of the routing wirings WRC (see FIG. 5) is omitted.

As shown in FIG. 17, the display device with touch detection functions 10 according to the second embodiment includes a substrate 21, a substrate 31, a plurality of driving electrodes COML and a plurality of detecting electrodes TDL, similarly to the first embodiment.

Further, as shown in FIG. 18, the display device with touch detection functions 10 according to the second embodiment includes an array substrate 2, an opposing substrate 3, a polarizing plate 4, a polarizing plate 5, a liquid crystal layer 6 and a sealing portion 7. The array substrate 2, the polarizing plate 4, the polarizing plate 5, the liquid crystal layer 6 and the sealing portion 7 of the second embodiment are the same as the respective portions of the array substrate 2, the polarizing plate 4, the polarizing plate 5, the liquid crystal layer 6 and the sealing portion 7 of the first embodiment, and explanations thereof are omitted.

In the second embodiment, the opposing substrate 3 includes a substrate 31, a color filter layer 32, a conductive pattern CB1 and a protection layer 33. The substrate 31, the color filter layer 32, the conductive pattern CB1 and the protection layer 33 in the display region Ad of the second embodiment are the same as the substrate 31, the color filter layer 32, the conductive pattern CB1 and the protection layer 33 of the display region Ad of the first embodiment.

Unlike the first embodiment, the opposing substrate 3 includes a conductive pattern CB2 in addition to the conductive pattern CB1 in the second embodiment. The conductive pattern CB2 includes a plurality of wirings WEL as electrodes. Each of the plurality of wirings WEL is provided on the upper surface of the substrate 31 in the peripheral region As.

The protection layer 33 is provided in the display region Ad and the peripheral region As. In the display region Ad, the protection layer 33 is provided on the upper surface of the substrate 31 to cover a plurality of detecting electrodes TDL. In the peripheral region As, the protection layer 33 is provided on the upper surface of the substrate 31 to cover the plurality of wirings WEL.

The polarizing plate 5 is provided on the protection layer 33 in the display region Ad and the peripheral region As. A conductive layer 52 is provided on the protection layer 33 via an adhesive layer 51 in the display region Ad and the peripheral region As.

The sheet resistance of the conductive layer 52 is higher than the sheet resistance of the conductive pattern CB2. With this arrangement, the S/N ratio of the detecting signals Vdet can be improved.

As shown in FIG. 19, upon application of static electricity SE to, for instance, a cover layer 55 which is the surface of the polarizing plate 5 from the exterior of the display device with touch detection functions 10, the static electricity SE first moved to the conductive layer 52 through the cover layer 55, a polarizing layer 54 and a cover layer 53. When the static electricity SE is moved to the conductive layer 52, the static electricity SE is disposed in the conductive layer 52 depending on the distribution of the plurality of capacities CP1 respectively formed between each of the plurality of detecting electrodes TDL and the conductive layer 52 and the distribution of a plurality of capacities CP2 respectively formed between each of the plurality of wirings WEL and the conductive layer 52, in the display region Ad and the peripheral region As. Thereafter, the static electricity SE disposed in the conductive layer 52 in the display region Ad is moved to each of the plurality of detecting electrodes TDL through the protection layer 33 having a resistance RS1. Further, static electricity SE disposed in the conductive layer 52 in the peripheral region As is moved to each of the plurality of wirings WEL through the protection layer 33 having a resistance RS2.

The static electricity SE moved to each of the plurality of detecting electrodes TDL is then moved through the detecting electrodes TDL, the routing wirings WRT, a terminal unit TM and a wiring substrate WS (see FIG. 17). The static electricity SE moved through the wiring substrate WS is then moved to a grounding line or the like of the display device with touch detection functions 10 through a resistance RS0 connected to an input terminal of the touch detection unit 40 (see FIG. 1) or an ESD protection circuit (not shown). With this arrangement, it is possible to discharge static electricity SE applied to the display device with touch detection functions 10 to the exterior of the display device with touch detection functions 10. On the other hand, static electricity SE moved to each of the plurality of wirings WEL can be discharged to the exterior of the display device with touch detection functions 10 through the wirings WEL.

Similarly to the conductive pattern CB1, the conductive pattern CB2 including the plurality of wirings WEL is made of a low resistance material having a specific resistance lower than the specific resistance of the transparent conductive material which is transparent with respect to visible light such as ITO or IZO. The sheet resistance of the conductive pattern CB2 made of a low resistance material is not more than 8 Ω/square, similarly to the sheet resistance of the conductive pattern CB1. In this case, it is possible to discharge static electricity without increasing the thickness of the conductive pattern CB2 that much when compared to a case the conductive pattern CB2 including a plurality of wirings WEL is made of a transparent conductive material such as ITO or IZO.

In this respect, the sheet resistance of the conductive pattern CB2 is also preferably not less than 0.04 Ω/square for the same reason as that of the sheet resistance of the conductive pattern CB1.

Preferably, the conductive pattern CB2 includes a metallic layer or an alloy layer. Accordingly, each of the plurality of wirings WEL included in the conductive pattern CB2 preferably includes a metallic layer or an alloy layer. With this arrangement, since the conductivity of each of the plurality of wirings WEL can be improved, it is possible to easily discharge static electricity applied from the exterior of the display device with touch detection functions 10 through the wirings WEL.

More preferably, each of the plurality of wirings WEL includes a metallic layer or an alloy layer of one or more metal selected from a group consisting of aluminum (Al), copper (Cu), silver (Ag), molybdenum (Mo), chrome (Cr) and tungsten (W). With this arrangement, the conductivity of each of the plurality of the wirings WEL can be further improved, so that static electricity applied from the exterior of the display device with touch detection functions 10 can be more easily discharged through the wirings WEL.

Preferably, a ratio of the total sum of areas of portions of the peripheral region As that overlap the conductive pattern CB2 in a plan view to the area of the peripheral region As is larger than the ratio of the total sum of areas of portions of the plurality of the sub-pixels SPix that overlap the conductive pattern CB1 in a plan view to the total sum of the areas of the plurality of sub-pixels SPix. Namely, the area ratio of the conductive pattern CB2 in the peripheral region As is larger than the area ratio of the conductive pattern CB1 with respect to the sub-pixels SPix in the display region Ad. Here, the area ratio of the conductive pattern CB2 in the peripheral region As is a ratio of the area of the conductive pattern CB2 with respect to the area of the peripheral region As.

Since no images are displayed in the peripheral region As, the transmittance of the peripheral region As might be higher than the transmittance of the display region Ad. Therefore, the area ratio of the conductive pattern CB2 in the peripheral region As can be made larger than the area ratio of the conductive pattern CB1 with respect to sub-pixels SPix in the display region Ad, and the resistance of the conductive pattern CB2 can be made lower than the resistance of the conductive pattern CB1. Accordingly, static electricity SE applied to the display device with touch detection functions 10 can be easily discharged to the exterior of the display device with touch detection functions 10 through the conductive pattern CB2.

More preferably, as shown in FIG. 17, the opposing substrate 3 includes a plurality of electrode terminals TWE provided on the upper surface of the substrate 31 in the peripheral region As, and the plurality of wirings WEL are electrically connected to each of the plurality of electrode terminals TWE. In such a case, each the plurality of wirings WEL is electrically connected to the exterior of the substrate 31 through each of the plurality of electrode terminals TWE. Accordingly, static electricity SE which has been applied to the display device with touch detection functions 10 and which has been moved to each of the plurality of wirings WEL are moved to the exterior of the display device with touch detection functions 10 through the wirings WEL and the electrode terminals TWE. With this arrangement, static electricity SE applied to the display device with touch detection functions 10 can be more easily discharged to the exterior of the display device with touch detection functions 10 when compared to the first embodiment.

<Main Features and Effects of the Present Embodiment>

Similarly to the display of the first embodiment, also in the display of the second embodiment, the sheet resistance of the conductive pattern CB1 is not more than 8 Ω/square. The ratio of the total sum of areas of portions of the plurality of the sub-pixels SPix that overlap the conductive pattern CB1 in a plan view to the total sum of the areas of the plurality of sub-pixels SPix is 1 to 22%. Further, the sheet resistance of the conductive layer 52 is higher than the sheet resistance of the conductive pattern CB1. With this arrangement, it is possible to reduce disturbances in display of images due to static electricity without deteriorating optical properties, similarly to the first embodiment.

Further, the display of the second embodiment includes the conductive pattern CB2 including a plurality of wirings WEL formed on the upper surface of the substrate 31 in the peripheral region As in addition to the conductive pattern CB1. The ratio of the area of the conductive pattern CB2 with respect to the area of the peripheral region As is larger than the ratio of the total sum of areas of portions of the plurality of the sub-pixels SPix that overlap the conductive pattern CB1 in a plan view to the total sum of the areas of the plurality of sub-pixels SPix.

With this arrangement, static electricity SE applied to the display device with touch detection functions 10 can be easily discharged to the exterior of the display device with touch detection functions 10 through the conductive pattern CB2 in addition to the conductive pattern CB1. Accordingly, it is possible to more easily reduce disturbances in display of images due to static electricity without deteriorating optical properties when compared to the first embodiment.

Third Embodiment

In the first embodiment, the polarizing plate provided on the opposite side of the array substrate with the opposing substrate being interposed therebetween includes a conductive layer. In contrast thereto, in the third embodiment, the polarizing plate provided on the opposite side of the array substrate with the opposing substrate being interposed therebetween does not include a conductive layer, but a protection layer provided to cover the conductive pattern functions as a conductive layer.

The overall configuration of the display of the third embodiment might be the same as the overall configuration of the display of the first embodiment and explanations thereof will be omitted.

<Display Device with Touch Detection Functions>

Figure 20:
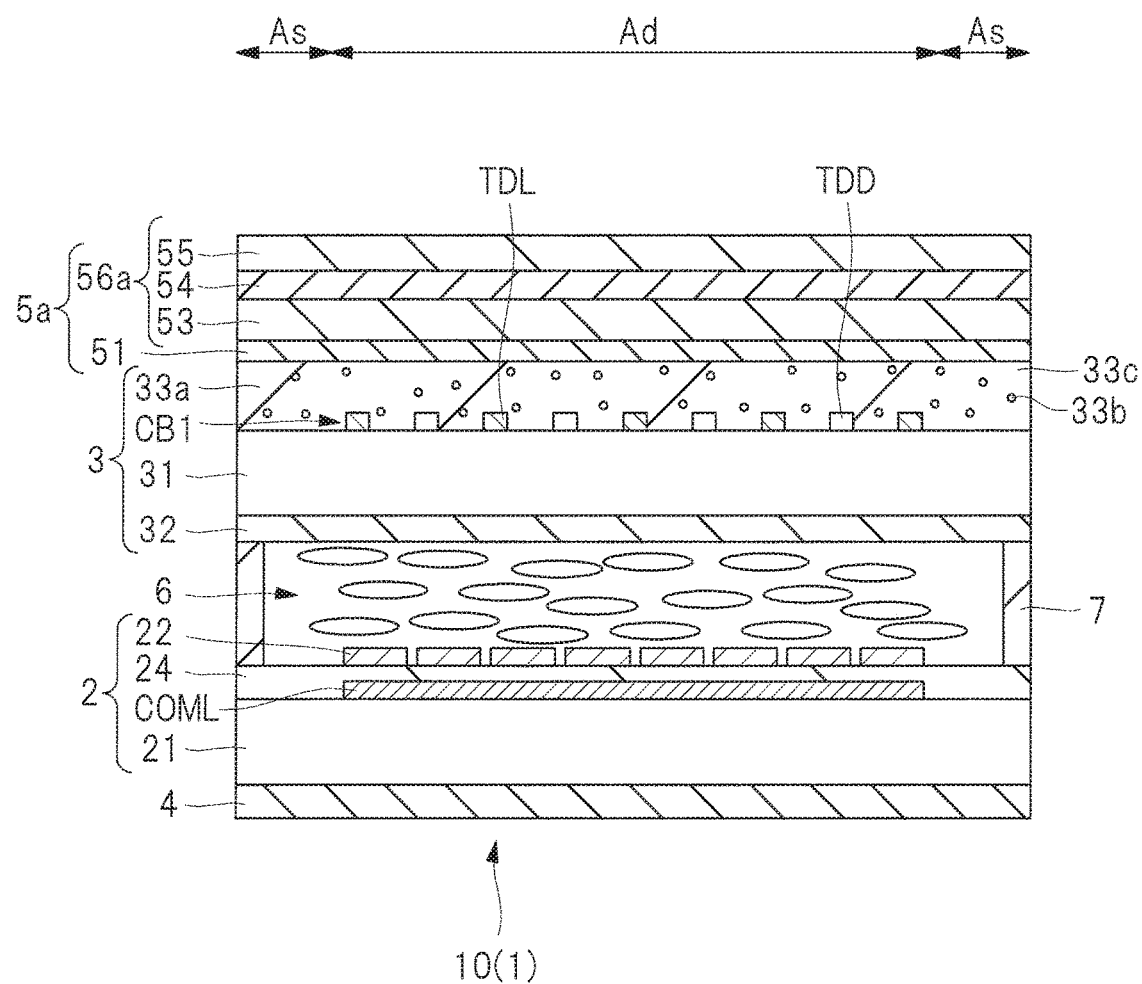
FIG. 20 is a sectional view showing a display device with touch detection functions of the display according to a third embodiment.
Figure 21:
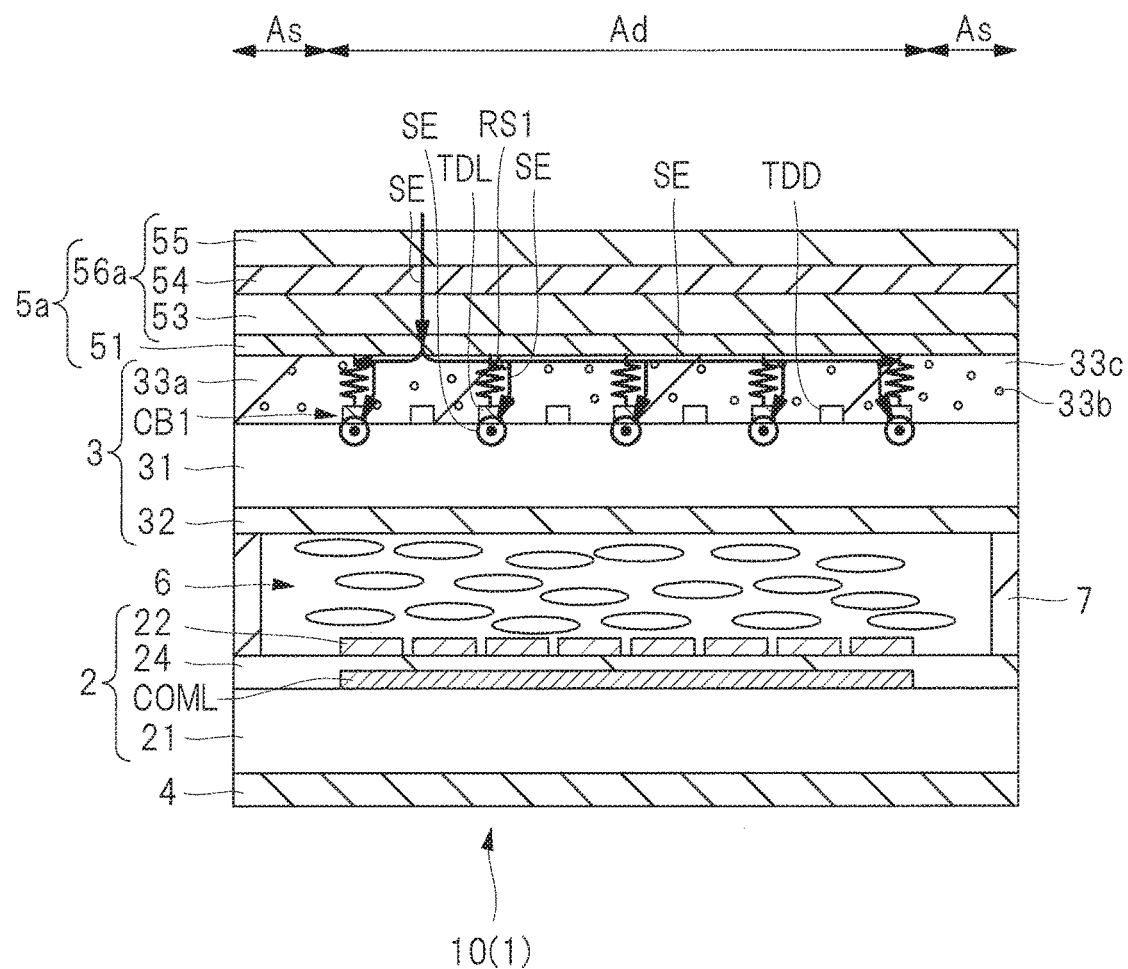
FIG. 21 is a sectional view schematically showing movements of static electricity in the display device with touch detection functions of the display according to a third embodiment.

FIG. 20 is a sectional view showing a display device with touch detection functions of the display according to the third embodiment. FIG. 21 is a sectional view schematically showing movements of static electricity in the display device with touch detection functions of the display according to the third embodiment.

As shown in FIG. 20, the display device with touch detection functions 10 according to the third embodiment includes an array substrate 2, an opposing substrate 3, a polarizing plate 4, a polarizing plate 5a, a liquid crystal layer 6 and a sealing portion 7. The array substrate 2, the polarizing plate 4, the liquid crystal layer 6 and the sealing portion 7 of the third embodiment are the same as the array substrate 2, the polarizing plate 4, the liquid crystal layer 6 and the sealing portion 7 of the first embodiment and explanations thereof are omitted.

In the third embodiment, the opposing substrate 3 includes a substrate 31, a color filter layer 32, a conductive pattern CB1 and a protection layer 33a. The substrate 31, the color filter layer 32 and the conductive pattern CB1 of the third embodiment are the same as the substrate 31, the color filter layer 32 and the conductive pattern CB1 of the first embodiment. Further, the arrangement of the detection unit detecting input positions based on electrostatic capacities of each of the plurality of detecting electrodes TDL included in the conductive pattern CB1 is the same as in the first embodiment.

In the third embodiment, the conductive layer 52 (see FIG. 6) of the first embodiment is not provided. Accordingly, the polarizing plate 5a includes an adhesive layer 51, a cover layer 53, a polarizing layer 54 and a cover layer 55. Each of the adhesive layer 51, the cover layer 53, the polarizing layer 54 and the cover layer 55 of the polarizing plate 5a might be the same as the adhesive layer 51, the cover layer 53, the polarizing layer 54 and the cover layer 55 of the polarizing plate 5 of the first embodiment. Accordingly, in the third embodiment, the polarizing plate 5a includes a stacked film 56a in which a plurality of layers including the polarizing layer 54 made of an insulating film are stacked in some order. The stacked film 56a is provided on the protection layer 33a via the adhesive layer 51.

On the other hand, in the third embodiment, the protection layer 33a exhibits conductivity. While the sheet resistance of the protection layer 33a is higher than the sheet resistance of the conductive pattern CB1, it is lower than the sheet resistance of the protection layer 33 of the first embodiment, and it might be of the same level as the sheet resistance of the conductive layer 52 of the first embodiment.

It is possible that the protection layer 33a is made of a film of resin 33c containing conductive particles 33b of metal such as silver (Ag). The conductive particles 33b are dispersed in the resin 33c as the insulating film. In such a case, it is possible to easily adjust the sheet resistance of the protection layer 33a in a wide range by adjusting the amount of content of the conductive particles 33b with respect to resin 33c.

As shown in FIG. 21, upon application of static electricity SE to, for instance, the cover layer 55 which is the surface of the polarizing plate 5a from the exterior of the display device with touch detection functions 10, the static electricity SE is moved, for instance, to the protection layer 33a through the cover layer 55, a polarizing layer 54, the cover layer 53 and the adhesive layer 51. Thereafter, the static electricity SE is moved to each of the plurality of detecting electrodes TDL through the protection layer 33a having a resistance RS1.

The static electricity SE moved to each of the plurality of detecting electrodes TDL is moved through the detecting electrodes TDL, routing wirings WRT, a terminal unit TM and a wiring substrate WS (see FIG. 5), similarly to the first embodiment. The static electricity SE moved through the wiring substrate WS is then moved to a grounding line or the like of the display device with touch detection functions 10 through a resistance RS0 connected to an input terminal of the touch detection unit 40 (see FIG. 1) or an ESD protection circuit (not shown). With this arrangement, it is possible to discharge static electricity SE applied to the display device with touch detection functions 10 to the exterior of the display device with touch detection functions 10.

Preferably, the sheet resistance of the protection layer 33a is $1\times10^8$ to $1\times10^{13}$ $\Omega$/square. With the sheet resistance of the protection layer 33a being not less than $1\times10^8$ $\Omega$/square, it is possible to reliably improve the S/N rate of the detecting signals Vdet and to prevent or restrict that adjoining detecting electrodes TDL short-circuit. Since the sheet resistance of the protection layer 33a is not more than $1\times10^{13}$ $\Omega$/square, static electricity can be easily moved within the protection layer 33a.

<Main Features and Effects of the Present Embodiment>

Similarly to the display of the first embodiment, also in the display of the third embodiment, the sheet resistance of the conductive pattern CB1 is not more than 8 $\Omega$/square. The ratio of the total sum of areas of portions of the plurality of the sub-pixels SPix that overlap the conductive pattern CB1 in a plan view to the total sum of the areas of the plurality of sub-pixels SPix is 1 to 22%.

On the other hand, the third embodiment is provided with the protection layer 33a instead of the protection layer 33 (see FIG. 6) of the first embodiment, and while the sheet resistance of the protection layer 33a is higher than the sheet resistance of the conductive pattern CB1, it is lower than the sheet resistance of the protection layer 33 of the first embodiment, and it might be of the same level as the sheet resistance of the conductive layer 52 of the first embodiment (see FIG. 6).

With this arrangement, static electricity applied from the exterior of the display device with touch detection functions 10 can be easily discharged to the exterior of the display device with touch detection functions 10 through the protection layer 33a and the conductive pattern CB1. Further, similarly to the first embodiment, since the specific resistance of the low resistance material included in the conductive pattern CB1 is lower than the specific resistance of the transparent conductive material, it is neither necessary to increase the thickness of the conductive pattern CB1 nor to increase the area ratio of the conductive pattern CB1. Accordingly, similarly to the first embodiment, it is possible to reduce disturbances in display of images due to static electricity without deteriorating optical properties.

Fourth Embodiment

<Touch Detection Function of Self-Capacity Method>

In the first embodiment, an example has been explained in which a touch panel of mutual capacity method provided with common electrodes operating as driving electrodes and with detecting electrodes is applied as the touch panel provided in the display. However, it is also possible to apply a touch panel of self-capacity method provided with detecting electrodes only as the touch panel provided in the display.

Figure 22:
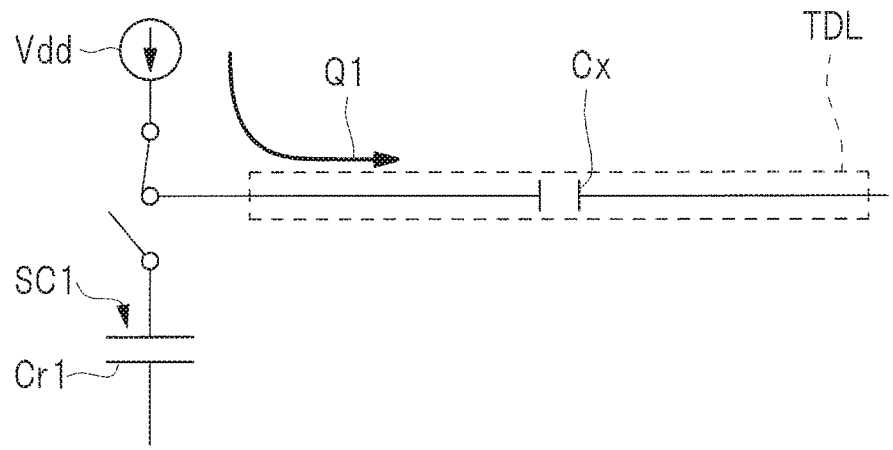
FIG. 22 is an explanatory view showing an electrically connected state of detecting electrodes of self-capacity method.
Figure 23:
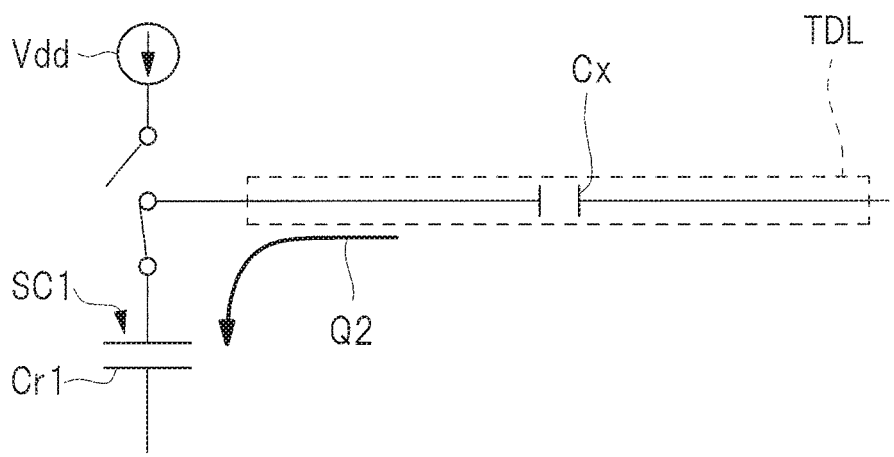
FIG. 23 is an explanatory view showing an electrically connected state of detecting electrodes of self-capacity method.

FIG. 22 and FIG. 23 are explanatory views showing electrically connected states of detecting electrodes of self-capacity method.

In a touch panel of self-capacity method, detecting electrodes TDL having an electrostatic capacity Cx are disconnected from a detection circuit SC1 having an electrostatic capacity Cr1 as shown in FIG. 22, and upon electric connection to a power source Vdd, electric charge Q1 is accumulated in the detecting electrodes TDL having an electrostatic capacity Cx. Next, when the detecting electrodes TDL having the electrostatic capacity Cx are disconnected from the power source Vdd and electrically connected to the detection circuit SC1 having the electrostatic capacity Cr1 as shown in FIG. 23, electric charge Q2 flowing out to the detection circuit SC1 is detected.

Here, when a finger has contacted or approached the detecting electrodes TDL, the electrostatic capacity Cx of the detection electrodes TDL changes due to the capacity of the finger, and when the detecting electrodes TDL are connected to the detection circuit SC1, the electric charge Q2 flowing out to the detection circuit SC1 also changes. Accordingly, by measuring the electric charge Q2 flowing out by the detection circuit SC1 and detecting changes in the electrostatic capacity Cx of the detection electrodes TDL, it is possible to determine whether a finger has contacted or approached the detecting electrodes TDL.

For instance, a case will be considered in which the display according to the present embodiment is the display according to the first embodiment applied to a display with touch detection functions of self-capacity method. At this time, the display includes a plurality of detecting electrodes TDL each extending in the X axis direction and being aligned in the Y axis direction at intervals in addition to a plurality of detecting electrodes TDL each extending in the Y axis direction (see FIG. 5) and being aligned in the X axis direction (see FIG. 5) at intervals. Also in such a case, it is also possible to two-dimensionally detect input positions by detecting changes in electrostatic capacities Cx of each of the plurality of detecting electrodes TDL extending in the Y axis direction and changes in electrostatic capacities Cx of each of the plurality of detecting electrodes TDL extending in the X axis direction. At this time, while the driving electrodes COML (see FIG. 5) operate as driving electrodes of the liquid crystal display device 20 (see FIG. 1), they do not operate as driving electrodes of the touch detection device 30 (see FIG. 1).

Also in such a case, it is possible to reduce disturbances in display of images due to static electricity without deteriorating optical properties, similarly to the first embodiment.

Alternatively, the display of the fourth embodiment might also be the display of the second embodiment or the third embodiment applied to a display with touch detection functions of self-capacity method, and also in such cases, it is possible to reduce disturbances in display of images due to static electricity without deteriorating optical properties, similarly to a case in which the display of the first embodiment is applied.

In the foregoing, the invention made by the inventors of the present invention has been concretely described based on the embodiments. However, it is needless to say that the present invention is not limited to the foregoing embodiments and various modifications and alterations can be made within the scope of the present invention.

In the category of the idea of the present invention, a person with ordinary skill in the art can conceive various modified examples and revised examples, and such modified examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention is effective when applied to displays.

What is claimed is:

1. A display comprising:
   a first substrate having a first main surface;
   a second substrate having a second main surface and a third main surface on an opposite side of the second main surface and being disposed to oppose the first substrate such that the second main surface and the first main surface of the first substrate oppose each other;
   a liquid crystal layer interposed between the first main surface of the first substrate and the second main surface of the second substrate;
   a plurality of pixels provided on the first main surface of the first substrate;
   a plurality of first electrodes respectively provided in each of the plurality of pixels on the first main surface of the first substrate;
   second electrodes provided on the first main surface of the first substrate;
   a first conductive pattern provided on the third main surface of the second substrate and made of one or more kinds of metals selected from a group including aluminum(Al), cupper(Cu), silver(Ag), molybdenum(Mo), chromium(Cr), and tungsten(W);
   a protection layer provided on the third main surface of the second substrate to cover the first conductive pattern; and
   a detection unit which detects input positions based on electrostatic capacities, wherein
the first conductive pattern includes
- a plurality of third electrodes having a mesh-like shape, and
- a plurality of dummy electrodes respectively arranged between instances of the third electrodes, the plurality of third electrodes are connected to the detection unit,
the plurality of dummy electrodes are not connected to the detection unit,
the first conductive pattern is provided on the third main surface of the second substrate in a display region of the third main surface of the second substrate,
the plurality of pixels are disposed in the display region of the third main surface of the second substrate in a plan view,
the display further includes a second conductive pattern provided on the third main surface of the second substrate in a peripheral region which is a region of the third main surface outside the display region in the plan view, the second conductive pattern including a plurality of wirings, and
a ratio of an area of the second conductive pattern to an area of the peripheral region in the plan view is larger than a ratio of a total sum of areas of portions of the plurality of pixels that overlap the first conductive pattern in the plan view to a total sum of areas of the plurality of pixels in the plan view.

2. The display according to claim 1,
wherein a specific resistance of the protection layer is higher than a specific resistance of the conductive layer.

3. The display according to claim 1,
wherein the protection layer has a thickness which is larger than a thickness of the first conductive pattern.

4. The display according to claim 1,
wherein the plurality of third electrodes are provided at intervals with respect to each other in the plan view, the second electrodes are provided to overlap each of the plurality of third electrodes in the plan view, and
the detection unit detects input positions based on electrostatic capacities between each of the plurality of third electrodes and the second electrodes.

5. The display according to claim 1,
wherein
the protection layer is provided to cover the first conductive pattern and the second conductive pattern in the display region and the peripheral region,
a sheet resistance of the second conductive pattern is not more than 8 Ω/square, and
a sheet resistance of the conductive layer is higher than the sheet resistance of the second conductive pattern.

6. The display according to claim 5,
wherein the second conductive pattern includes a plurality of fourth electrodes provided on the third main surface of the second substrate in the peripheral region,
the display further includes a plurality of electrode terminals provided on the third main surface of the second substrate in the peripheral region, and
the plurality of fourth electrodes are electrically connected to each of the plurality of electrode terminals.

7. The display according to claim 5,
wherein the first conductive pattern includes a plurality of fifth electrodes provided on the third main surface of the second substrate in the display region.

8. The display according to claim 7,
wherein the plurality of fifth electrodes are provided at intervals with respect to each other in the plan view,
the second electrodes are provided to overlap each of the plurality of fifth electrodes in the plan view, and
the detection unit detects input positions based on electrostatic capacities of each of the plurality of the fifth electrodes and the second electrodes.

* * * * *